US010229392B2

(12) United States Patent
Mayumi et al.

(10) Patent No.: US 10,229,392 B2
(45) Date of Patent: Mar. 12, 2019

(54) GROUP SUPPORTING APPARATUS FOR RECOGNIZING DENSITY OF DISCUSSIONS AND ACTIVITY LEVELS OF INDIVIDUALS AND RELATED COMPUTER READABLE RECORDING MEDIUM

(71) Applicant: FUJITSU LIMITED, Kawasaki-shi (JP)

(72) Inventors: Hidehiko Mayumi, Kawasaki (JP); Toshio Tanaka, Kawasaki (JP); Takeaki Kobayashi, Kawasaki (JP); Takehiro Nabae, Kawasaki (JP); Kenji Sakata, Kawasaki (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 0 days.

(21) Appl. No.: 15/233,425

(22) Filed: Aug. 10, 2016

(65) Prior Publication Data

US 2016/0350717 A1    Dec. 1, 2016

Related U.S. Application Data

(62) Division of application No. 13/726,868, filed on Dec. 26, 2012, now Pat. No. 9,449,069.

(30) Foreign Application Priority Data

Mar. 27, 2012 (JP) .................................. 2012-072235

(51) Int. Cl.
*G06F 17/30* (2006.01)
*G06Q 10/10* (2012.01)
(Continued)

(52) U.S. Cl.
CPC ..... *G06Q 10/103* (2013.01); *G06F 17/30598* (2013.01); *G06F 17/30713* (2013.01);
(Continued)

(58) Field of Classification Search
CPC combination set(s) only.
See application file for complete search history.

(56) References Cited

U.S. PATENT DOCUMENTS 8,090,402 B1 * 1/2012 Fujisaki ................ H04M 1/575
455/410
8,468,244 B2 * 6/2013 Redlich .................. G06Q 10/06
709/225
(Continued)

FOREIGN PATENT DOCUMENTS

JP    2004-227343    8/2004
JP    2004-259122    9/2004
(Continued)

OTHER PUBLICATIONS

McLaren, Bruce M., Oliver Scheuer, and Jan Mikšátko. "Supporting collaborative learning and e-discussions using artificial intelligence techniques." International Journal of Artificial Intelligence in Education 20, No. 1 (2010): 1-46.*
(Continued)

*Primary Examiner* — Farhan M Syed
(74) *Attorney, Agent, or Firm* — Staas & Halsey LLP

(57) ABSTRACT

A group supporting apparatus and related computer readable recording medium to execute a process including: collecting input contents, which are input by participants via terminals, from the terminals; arranging the collected input contents into input content groups based on groups to which the participants belong; setting a representative flag on each of representative input contents selected from the respective input content groups; extracting the representative input contents and matching input contents, which match a predetermined extracting condition and are different from the representative input contents, from the collected input contents; and displaying a list of the representative input con-
(Continued)

tents and the matching input contents on a display device that all the participants are able to view at a same time.

21 Claims, 35 Drawing Sheets

(51) Int. Cl.
  *G06Q 50/20* (2012.01)
  *G09B 7/02* (2006.01)
(52) U.S. Cl.
  CPC ........... *G06Q 10/101* (2013.01); *G06Q 50/20* (2013.01); *G09B 7/02* (2013.01)

(56) References Cited

U.S. PATENT DOCUMENTS

| | | | | |
|---|---|---|---|---|
| 8,666,961 | B1* | 3/2014 | Qureshi | G06F 17/30312 707/705 |
| 8,676,937 | B2* | 3/2014 | Rapaport | H04L 51/32 709/219 |
| 2008/0005130 | A1* | 1/2008 | Logan | G06F 17/30053 |
| 2009/0254572 | A1* | 10/2009 | Redlich | G06Q 10/06 |
| 2010/0250497 | A1* | 9/2010 | Redlich | F41H 13/00 707/661 |
| 2012/0054278 | A1* | 3/2012 | Taleb | G06Q 50/01 709/204 |
| 2012/0290950 | A1* | 11/2012 | Rapaport | H04L 51/32 715/753 |
| 2016/0210602 | A1* | 7/2016 | Siddique | G06Q 20/0453 |

FOREIGN PATENT DOCUMENTS

| | | |
|---|---|---|
| JP | 2007-241901 | 9/2007 |
| JP | 2009-151483 | 7/2009 |
| JP | 2009-295105 | 12/2009 |

OTHER PUBLICATIONS

McLaren, Bruce M. et al., "Supporting collaborative learning and e-Discussions using artificial intelligence techniques," International Journal of Artificial Intelligence in Education 20, No. 1 (2010): 1-46.
Jung, Jason J., "Collaborative Web Browsing Based on Semantic Extraction of User Interests with Bookmarks," J. UCS 11, No. 2 (2005): 213-228.
Patent Abstracts of Japan, Publication No. 2004-259122, Published Sep. 16, 2004.
Patent Abstracts of Japan, Publication No. 2007-241901, Published Sep. 20, 2007.
Japanese Office Action dated Sep. 29, 2015 in corresponding Japanese Patent Application No. 2012-072235.
Patent Abstracts of Japan, Publication No. 2004-227343, Published Aug. 12, 2004.
Patent Abstracts of Japan, Publication No. 2009-295105, Published Dec. 17, 2009.
Patent Abstracts of Japan, Publication No. 2009-151483, Published Jul. 9, 2009.
Notice of Allowance for U.S. Appl. No. 13/726,868, dated Jun. 29, 2016.
Office Action for U.S. Appl. No. 13/726,868, dated Nov. 19, 2015.
Final Office Action for U.S. Appl. No. 13/726,868, dated Apr. 7, 2015.
Office Action for U.S. Appl. No. 13/726,868, dated Jul. 3, 2014.
U.S. Appl. No. 13/726,868, filed Dec. 26, 2016, Hidehiko Mayumi et al., Fujitsu Limited.
Japanese Office Action dated Jun. 20, 2017 in corresponding Japanese Patent Application No. 2016-154325.

* cited by examiner

FIG.1
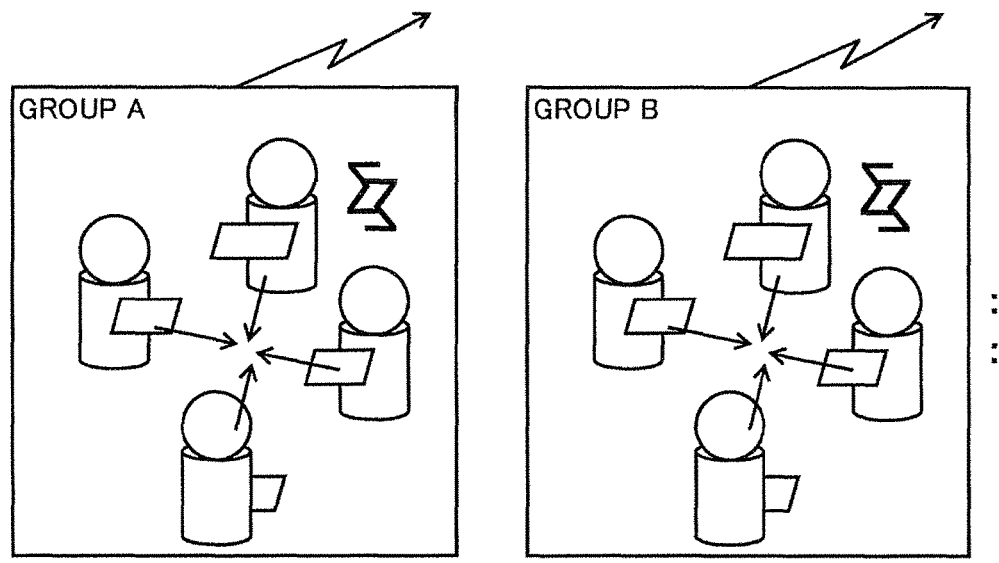
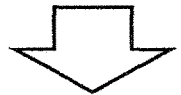
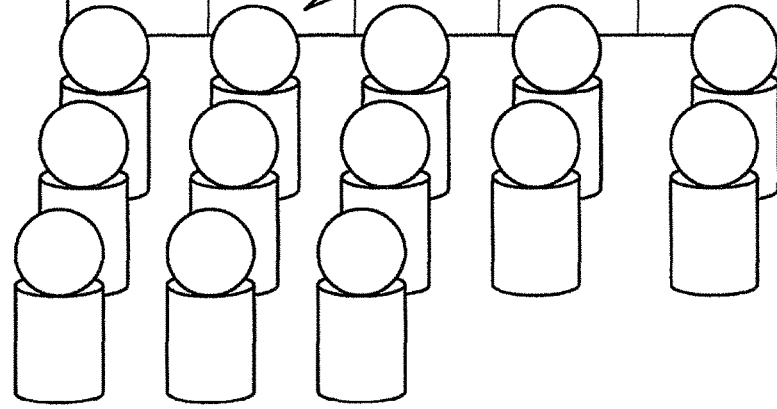

| STUDENT ID | GROUP ID | NAME | LEADER FLAG |
|---|---|---|---|
| ST001 | A | T. TANAKA | 1 |
| ST002 | A | J. KOBAYASHI | |
| ST003 | A | H. OHTA | |
| ST004 | A | M. SHINAGAWA | |
| ST005 | B | R. KAWASAKI | 1 |
| : : | : : | : : | : : |

FIG.7

| AGENDA ID | AGENDA | DISPLAY CATEGORY |
|---|---|---|
| Q001 | WHAT DO YOU THINK ABOUT UNDER-AGE ABORTION ? | AGREE · DISAGREE · PERMIT |
| Q002 | . . | |

| AGENDA ID | GROUP ID | ACTIVITY LEVEL | OPINION ID | OPINION CATEGORY | OPINION CONTENTS | STUDENT ID | REPRESEN-TATIVE FLAG | OPPOSING OPINION FLAG | RELATED OPINION FLAG |
|---|---|---|---|---|---|---|---|---|---|
| Q001 | A | HIGH | OP001 | AGREE | I AGREE BECAUSE THE CHILD WON'T BE HAPPY IF YOU CANNOT AFFORD. AFTER BECOMING INDEPENDENT, YOU CAN HAVE A BABY. | ST001 | | 1 | |
| | | | OP002 | DISAGREE | I DISAGREE BECAUSE IT IS UNETHICAL TO TAKE ONE'S LIFE BY SUCH PARENTS' SELFISH REASON. | ST002 | 1 | | |
| | | | OP003 | PERMIT | AS A MATTER OF FACT, THE COST FOR ABORTION IS NOT EXPENSIVE. MANY YOUNG GENERATION DO NOT HESITATE ON ABORTION. | ST003 | | 1 | |
| | | | OP004 | | ⋮ | ST004 | | | |
| | | | OP005 | | ⋮ | ST005 | | | |
| | B | LOW | OP006 | DISAGREE | I DON'T HAVE ANY SPECIFIC REASON BUT I DISAGREE. | ST006 | 1 | | |
| ⋮ | ⋮ | | ⋮ | | ⋮ | ⋮ | ⋮ | ⋮ | ⋮ |

| AGENDA ID | CATEGORY | KEYWORDS | DETERMINATION CONDITION |
|---|---|---|---|
| Q001 | AGREE | ECONOMIC, INDEPENDENT, CHILD CARE, ... | • ACTIVITY LEVEL IS DETERMINED TO BE HIGH IF EACH KEYWORD IN CATEGORY IS INCLUDED FIVE TIMES OR MORE IN OPINIONS OF STUDENTS IN GROUP. OTHERWISE, ACTIVITY LEVEL IS DETERMINED TO BE LOW |
| Q001 | PERMIT | TREND, AFFORD, THESE DAYS, ... | |
| Q001 | DISAGREE | LIFE, KILL, ETHIC, ... | |
| ⋮ | ⋮ | ⋮ | ⋮ |

Q1.WHAT DO YOU THINK ABOUT UNDER-AGE ABORTION ? —112

—111

(1)AGREE? DISAGREE? PERMIT?

| AGREE | PERMIT | DISAGREE | —113

(2)WRITE YOUR REASON ! (20 WORDS OR LESS)

I DISAGREE BECAUSE IT IS UNETHICAL TO TAKE ONE'S LIFE BY SUCH PARENTS' SELFISH REASON. —114

REGISTER ! —115

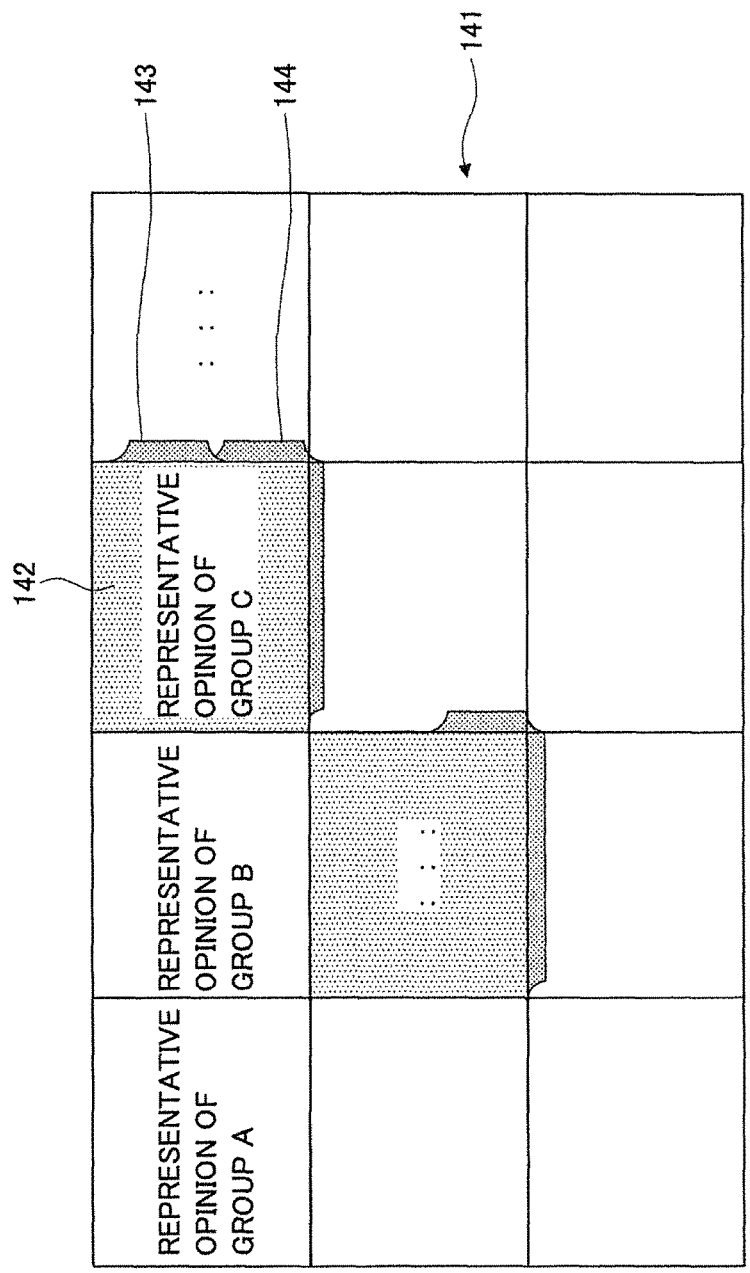

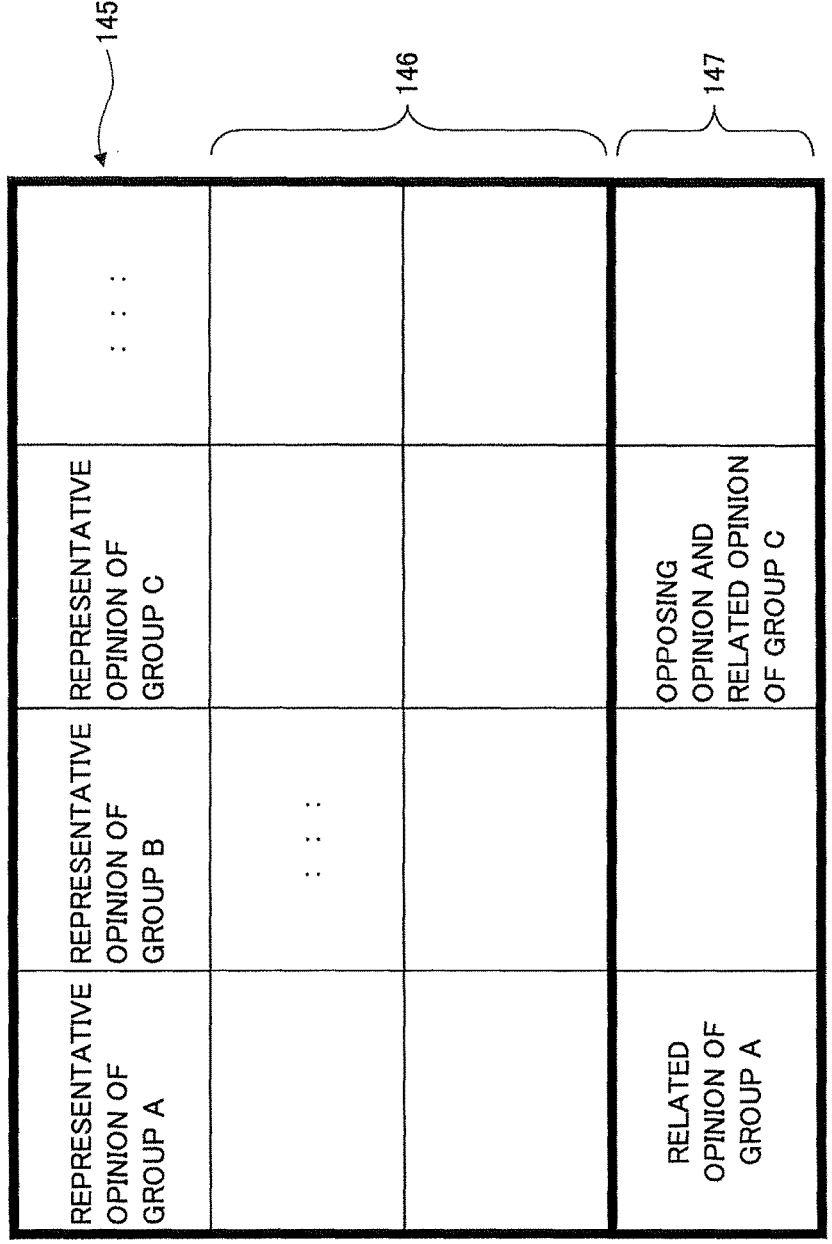

FIG.15

| REPRESENTATIVE OPINION OF GROUP A | REPRESENTATIVE OPINION OF GROUP B | REPRESENTATIVE OPINION OF GROUP C | ↙ 151 |
|---|---|---|---|
| | ⋮ | ⋮ | ⋮ |
| | | | |

FIG.17

| AGENDA ID | CATEGORY | KEYWORDS | DETERMINATION CONDITION |
|---|---|---|---|
| Q001 | AGREE | ECONOMIC, INDEPENDENT, CHILD CARE, ... | ACTIVITY LEVEL IS DETERMINED TO BE HIGH WHEN THE NUMBER OF WORDS ARE 1000 OR MORE. OTHERWISE, LOW. |
| Q001 | PERMIT | TREND, AFFORD, THESE DAYS, ... | |
| Q001 | DISAGREE | LIFE, KILL, ETHIC, ... | |
| : | : | : | : |

| AGENDA ID | OPINION ID | OPINION | | STUDENT ID | REPRESENTATIVE FLAG | INFREQUENT REPRESENTING TIMES FLAG |
| --- | --- | --- | --- | --- | --- | --- |
| | | CATEGORY | CONTENTS | | | |
| Q001 | OP001 | AGREE | I AGREE BECAUSE THE CHILD WON'T BE HAPPY IF YOU CANNOT AFFORD. AFTER BECOMING INDEPENDENT, YOU CAN HAVE A BABY. | ST001 | | |
| | OP002 | .. | ........ | ST002 | 1 | |
| | OP003 | .. | ........ | ST003 | | 1 |
| | OP004 | .. | ........ | ST004 | | |
| | OP005 | .. | ........ | ST005 | | |
| .. | .. | .. | .. | .. | .. | .. |

| STUDENT ID | REPRESENTING TIMES | EXTRACTING CONDITION |
|---|---|---|
| ST002 | 14 | BOTTOM 10% |
| : : | : : | |
| ST003 | 1 | |

241

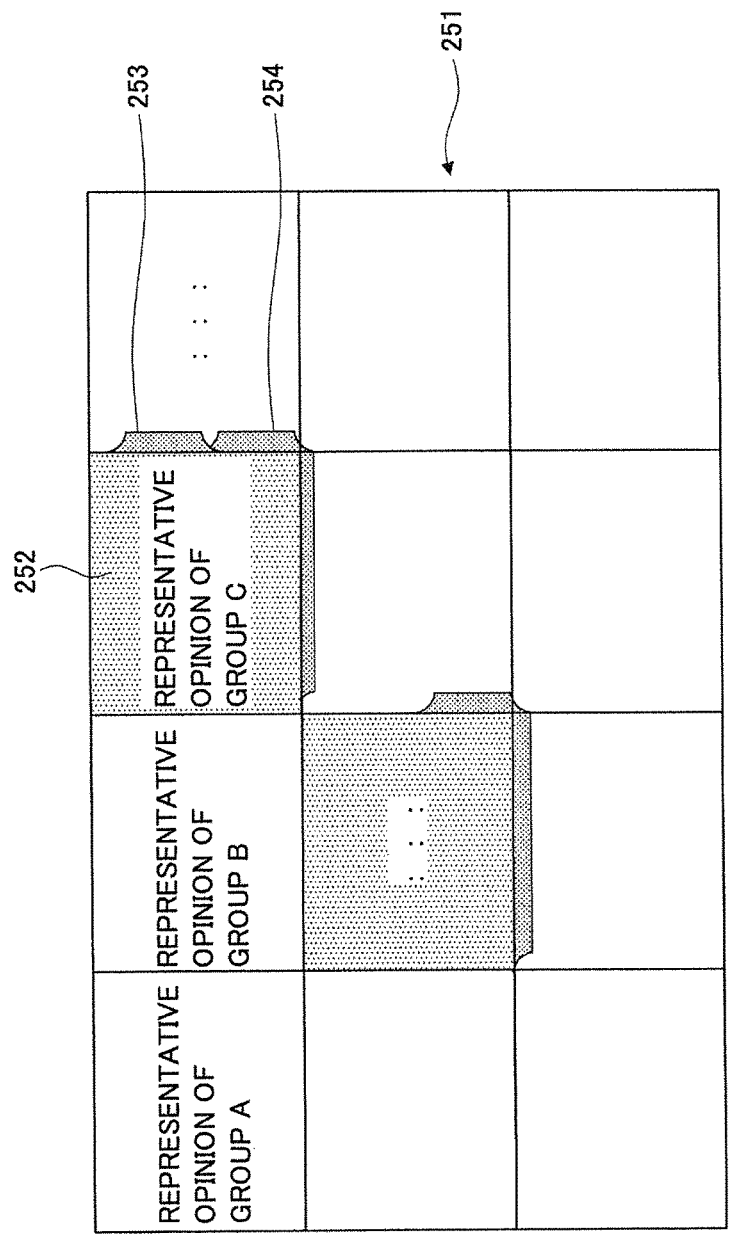

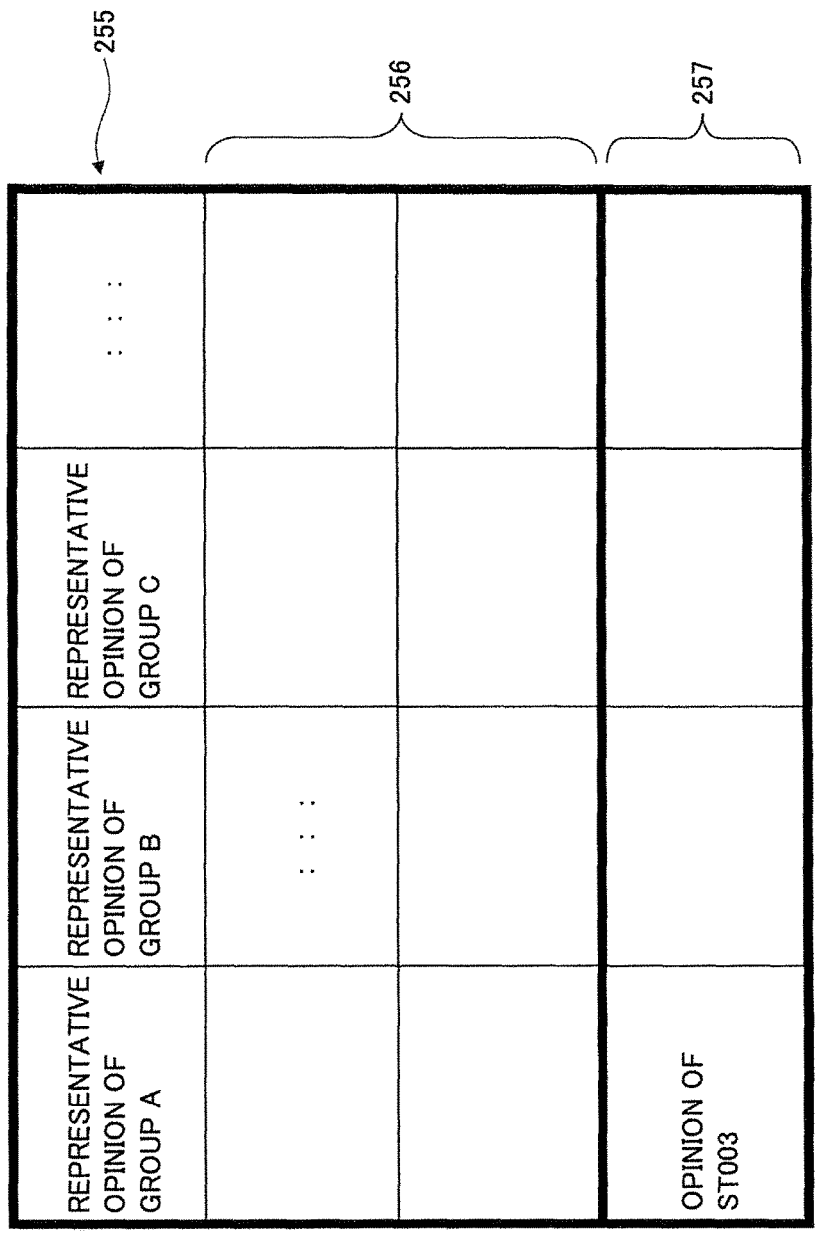

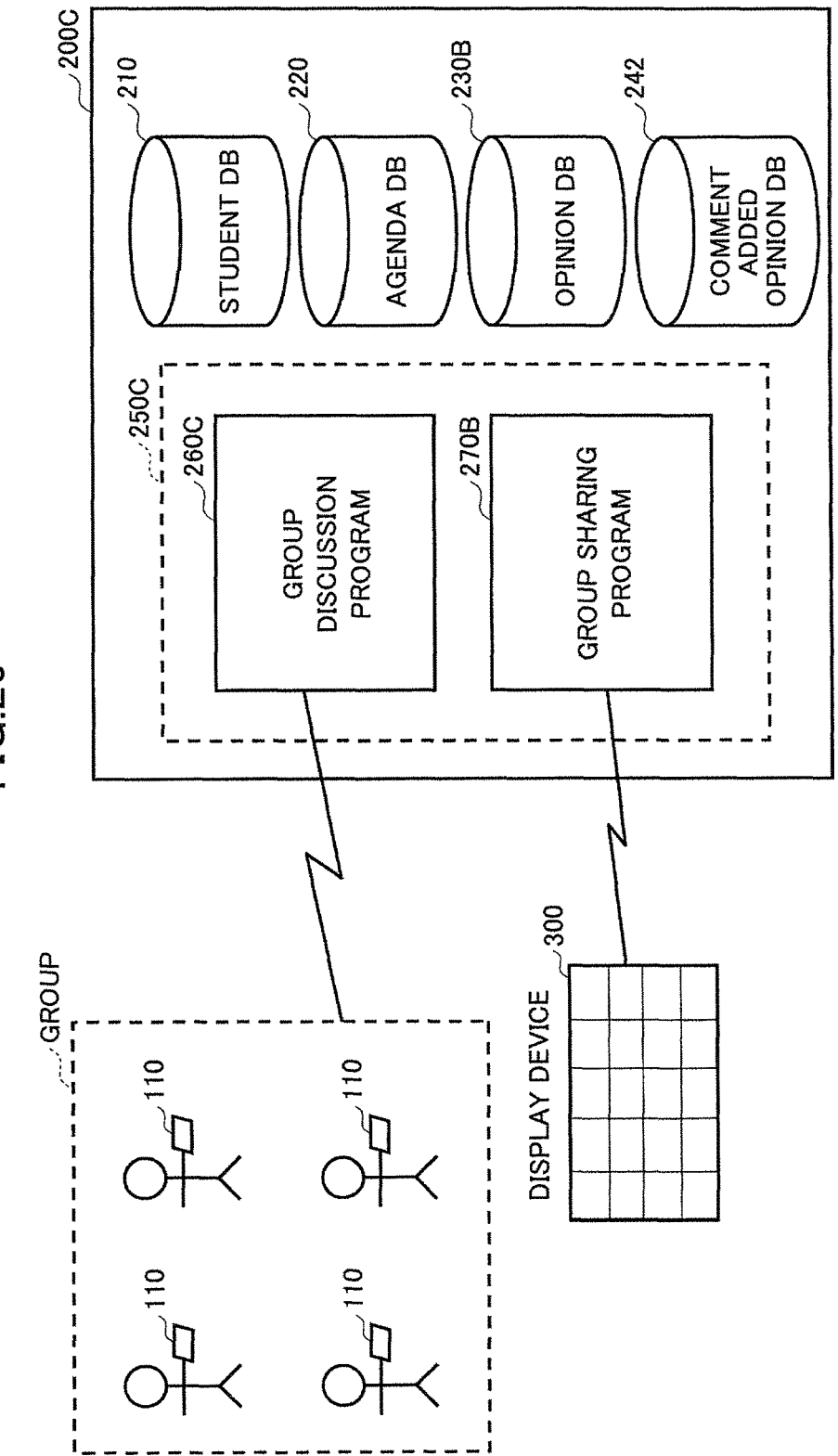

FIG.28

| AGENDA ID | OPINION | | | STUDENT ID | REPRESEN-TATIVE FLAG | COMMENT ADDED OPINION FLAG | COMMENT ID |
|---|---|---|---|---|---|---|---|
| | OPINION ID | CATEGORY | CONTENTS | | | | |
| Q001 | OP001 | AGREE | I AGREE BECAUSE THE CHILD WON'T BE HAPPY IF YOU CANNOT AFFORD. AFTER BECOMING INDEPENDENT, YOU CAN HAVE A BABY. | ST001 | | 1 | CM001 |
| | OP002 | .. | ....... | ST002 | 1 | | .. |
| | OP003 | .. | ....... | ST003 | | | .. |
| | OP004 | .. | ....... | ST004 | | | .. |
| | OP005 | .. | ....... | ST005 | | | .. |
| .. | .. | .. | .. | .. | .. | .. | .. |

| AGENDA ID | COMMENT ID | KEYWORDS | COMMENTS |
|---|---|---|---|
| Q001 | CM001 | AFFORD, INDEPENDENT | YOUR PARENTS MAY UNDERSTAND AND TAKE CARE YOUR BABY FOR A WHILE. |
| | CM002 | TREND | STATISTICAL ABORTION RATE IS % (YEAR 20). |
| | : : | : : | : : |
| : : | | | |

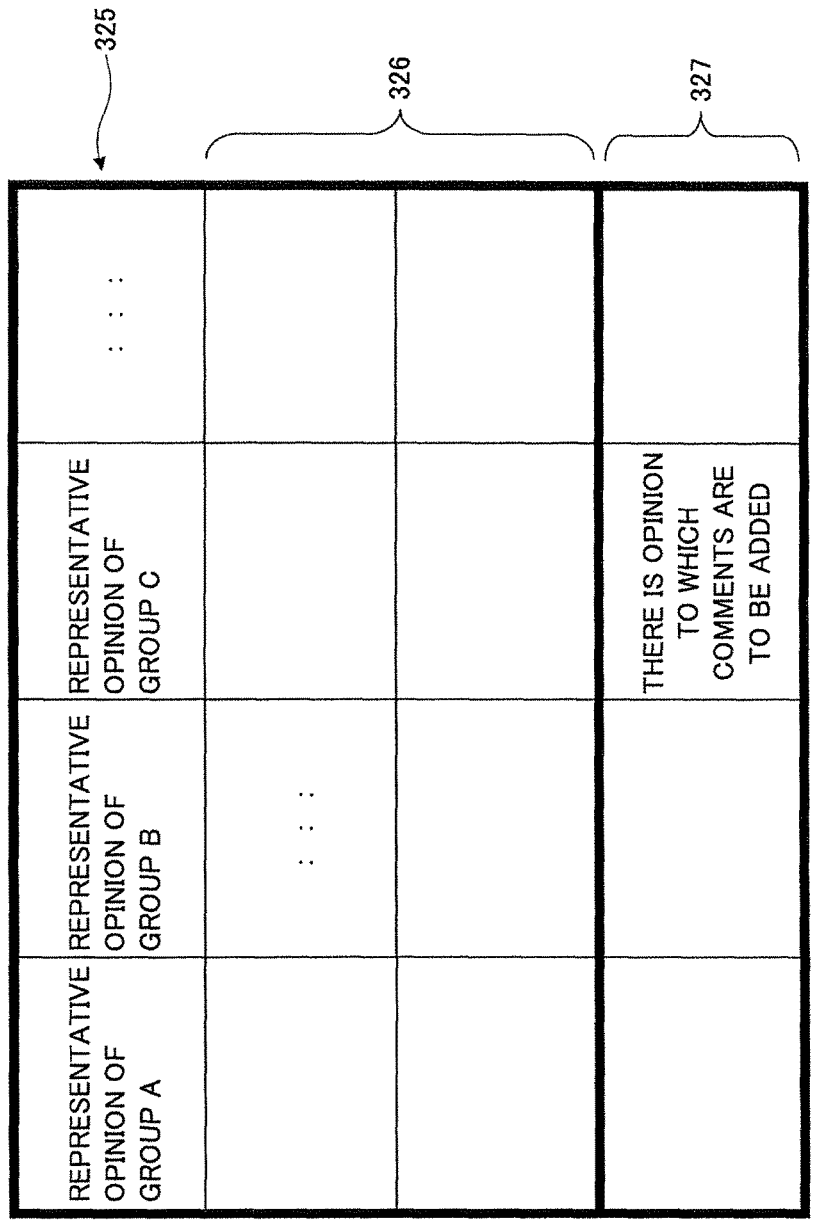

GROUP SUPPORTING APPARATUS FOR RECOGNIZING DENSITY OF DISCUSSIONS AND ACTIVITY LEVELS OF INDIVIDUALS AND RELATED COMPUTER READABLE RECORDING MEDIUM

CROSS-REFERENCE TO RELATED APPLICATION

This application is a divisional of U.S. patent application Ser. No. 13/726,868, filed Dec. 26, 2012, which is based upon and claims the benefit of priority of the prior Japanese Patent Application No. 2012-072235, filed on Mar. 27, 2012, the entire contents of which are incorporated herein by reference.

FIELD

The embodiment discussed herein is related to a group work support system, a group work support server, a group work support system, and a recording medium.

BACKGROUND

Recently, demonstration tests for next-generation education and the like have been conducted using electronic terminals such as tablet terminals. It is also expected that such next-generation education becomes more popular across the country.

In one aspect of education, a discussion among students has been conducted in a class. Such discussion is thought to be important for students in order to have their own solid way of thinking as a result of presentation of their opinions and absorption of other students' opinions through "speaking" and "listening" in discussions.

In next-generation education, it is expected to conduct discussions using electronic terminals. Such discussions include, for example, a group discussion which is a collaborative work determining one representative opinion of the group (group opinion).

In such a group discussion using the electronic terminals, the opinions input by the students in the same group may be shared among the students. Therefore, not only conventional "speaking" and "listening" but also "writing" and "reading" become necessary. As a result, the discussions may be conducted more effectively due to use of visual sense.

To collect opinions via the electronic terminals, there has been known techniques of, for example, extracting an opinion of a small number of people and conducting an opinion analysis by focusing on a specific issue.

References may be made to Japanese Laid-open Patent Publication Nos. 2009-295105, 2009-151483, and 2004-227343.

SUMMARY

According to an aspect, a method of supporting a group work includes collecting input contents, which are input by participants via terminals, from the terminals; arranging the collected input contents into input content groups based on groups to which the participants belong; setting a representative flag on each of representative input contents selected from the respective input content groups; extracting the representative input contents and matching input contents, which match a predetermined extracting condition and are different from the representative input contents, from the collected input contents; and displaying a list of the representative input contents and the matching input contents on a display device that all the participants are able to view at a same time.

The object and advantage of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 1 illustrates an example form of a group discussion using electronic terminals;

FIG. 6 illustrates an example student database according to the first embodiment;

FIG. 7 illustrates an example agenda database according to the first embodiment;

FIG. 8 illustrates an example opinion database according to the first embodiment;

FIG. 9 illustrates an example activity level determination database according to the first embodiment;

FIG. 11 illustrates an example screen displaying agenda on a student terminal;

FIGS. 14A and 14B illustrate examples where representative opinions of groups are displayed on a display device according to the first embodiment;

FIG. 15 illustrates an example where representative opinions are displayed;

FIG. 17 illustrates an example activity level determination database according to the second embodiment;

FIG. 21 illustrates an example opinion database according to the third embodiment;

FIG. 22 illustrates an example representing times database according to the third embodiment;

FIGS. 25A and 25B illustrate examples where representative opinions of the groups are displayed on the display device according to the third embodiment;

FIG. 26 illustrates an example configuration of the opinion collection system according to a fourth embodiment;

FIG. 28 illustrates an example opinion database according to the fourth embodiment;

FIG. 29 illustrates an example comment added opinion database according to the fourth embodiment;

FIGS. 32A and 32B illustrate examples where representative opinions of the groups are displayed on the display device according to the fourth embodiment.

DESCRIPTION OF EMBODIMENT

In such a group discussion, some groups may conduct discussion actively but others may not. Due to this, in a process of determining representative opinions of the respective groups, there may be differences in the density of discussions among the groups and activity levels (activity state) of individuals in the same group. However, the process of determining the representative opinions of the respective groups may not be reflected. Specifically, it may be difficult to know what opinions other than the representative opinion are discussed in the group.

According to an embodiment, it may become possible to provide a group work support method, a group work support program, a group work support server, and a group work support system in which it is possible to recognize the density of discussions and activity levels of the individuals.

The group work support program to realize the functions executed in the processes of the group work support method may be stored in a computer-readable non-transient recording medium.

In the following, an example form of a group discussion using electronic terminals is described with reference in FIG. 1. FIG. 1 illustrates the example form of the group discussion using the electronic terminals.

In the group discussion using the electronic terminals, the electronic terminals are provided to the respective participants of the discussion, so that the participants may input their opinions to their own electronic terminals. The opinions having been input to the electronic terminals may be shared among groups. In each group, a discussion may be conducted about the shared opinions of the participants, so as to determine the representative opinion of the group. For example, the discussions in the groups may be conducted orally or using chatting via the electronic terminals.

When the representative opinion of the group is determined, the representative opinion is transmitted from the electronic terminal of a group leader to a server. The server causes a display device to display the representative opinions of the groups. After the representative opinions of the groups are displayed, further discussion may be conducted across the entire groups or the like.

In the following descriptions of embodiments, it is assumed that the group discussion is conducted among plural groups by dividing students of a class into the plural groups.

First Embodiment

In the following, a first embodiment is described with reference to the drawings.

Figure 2:
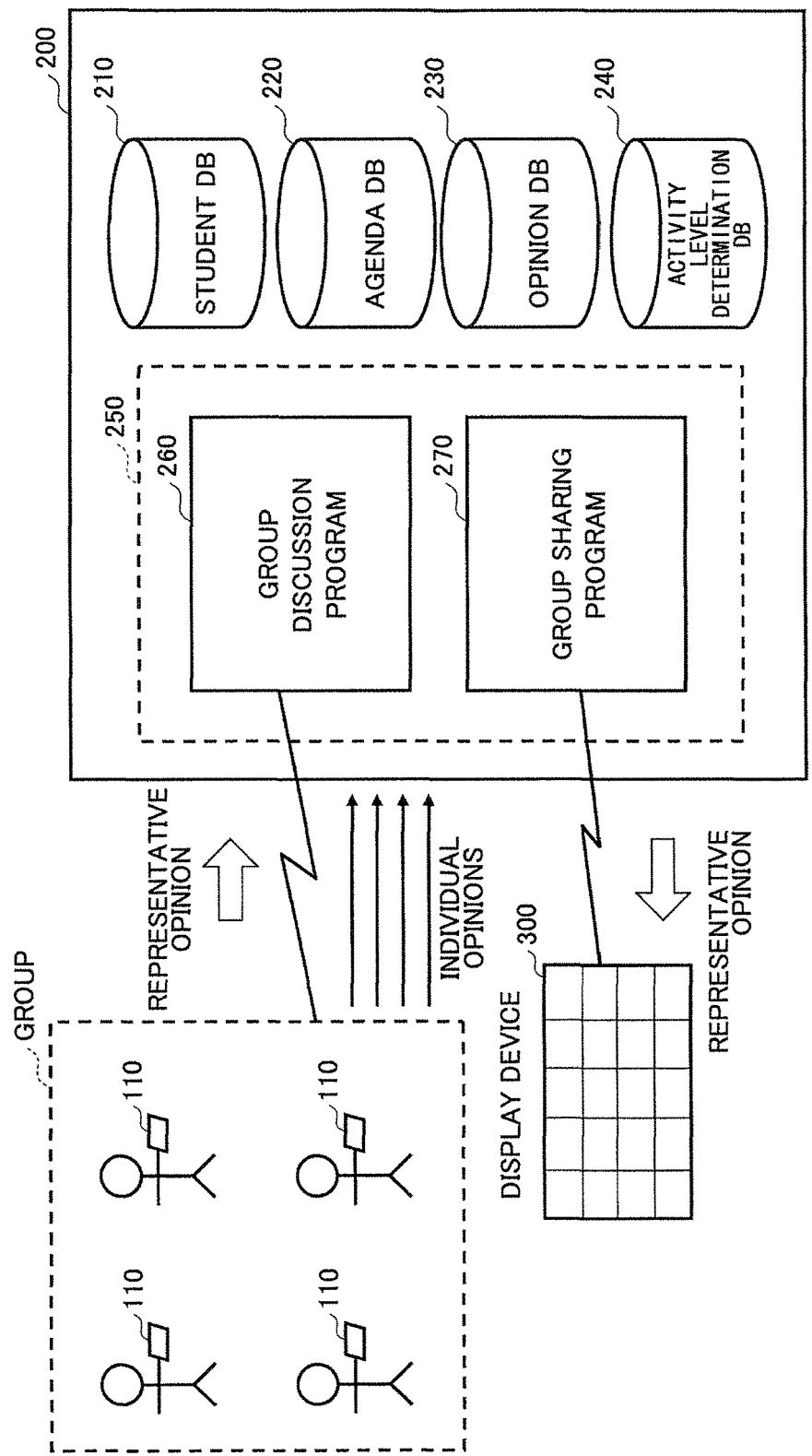
FIG. 2 illustrates an example configuration of an opinion collection system according to a first embodiment.

FIG. 2 illustrates an example configuration of an opinion collection system according to the first embodiment.

As illustrated in FIG. 2, an opinion collection system 100 includes student terminals 110 to be distributed to and used by respective students, an opinion collection server 200 corresponding to a teacher terminal to be used by a teacher, and a display device 300. The student terminals 100, the opinion collection server 200, and the display device 300 are connected via a wireless LAN (Local Area Network) or the like.

The student terminals 110 may be tablet terminals or the like. An application for the group discussion may be installed in the student terminals 110.

The opinion collection server 200 includes a student database 210, an agenda database 220, an opinion database 230, and an activity level determination database 240. Further, it is assumed that an opinion collection program 250 is installed in the opinion collection server 200 according to this embodiment. The opinion collection program 250 includes a group discussion program 260 and a group sharing program 270.

The group discussion program 260 is used to share individual opinions of the students among the student terminals 110. Further, when the representative opinion is determined, the group discussion program 260 causes the opinion collection server 200 to execute a process of registering the representative opinion.

The group sharing program 270 causes the opinion collection server 200 to execute a process of displaying a list of the representative opinions of the groups and other opinions on the display device 300 which is shared among students.

The display device 300 is a display or the like. Preferably, the display device 300 may be, for example, an electronic display board so that students may view at the same time.

In the opinion collection system 100 according to this embodiment, not only the representative opinion selected in the group but also the opinions separately input to the student terminals 110 are transmitted to and stored into the opinion collection server 200.

Further, when there is an opinion opposite to representative opinion (opposing opinion), an opinion related to the representative opinion (related opinion) among the opinions of the participants or the like, the opinion collection server 200 according to this embodiment causes the display device 300 to further display such an opposing opinion and the related opinion, so that the existence of the opposing opinion, the related opinion or the like becomes clear.

Figure 3:
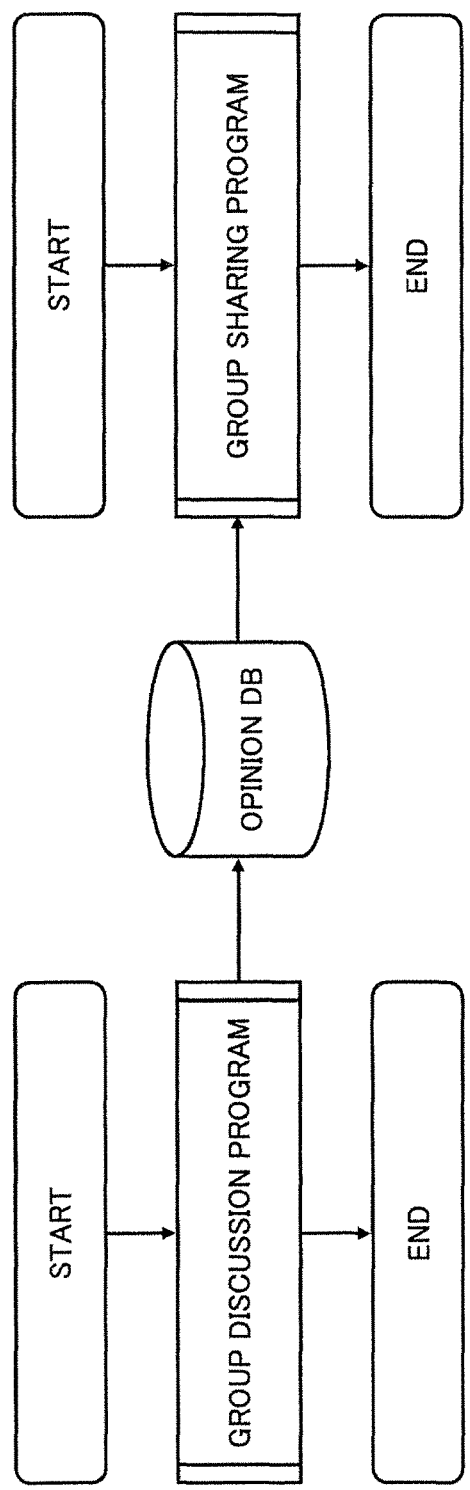
FIG. 3 is an example flowchart of operations of an opinion collection server.

FIG. 3 is an example flowchart of the operations of the opinion collection server 200.

In this embodiment, the group discussion program 260 causes the opinion collection server 200 to collect opinions from the student terminals 110 and to store the collected opinions into the opinion database 230. The group sharing program 270 causes the opinion collection server 200 to perform display control based on the collected opinions.

The term "opinion" in this embodiment includes, for example, text data having been input to the student terminals 110 and information items indicating choices reflecting the opinions of the students using the student terminals 110, and also corresponds to the input contents having been input to the student terminals 110.

Figure 4:
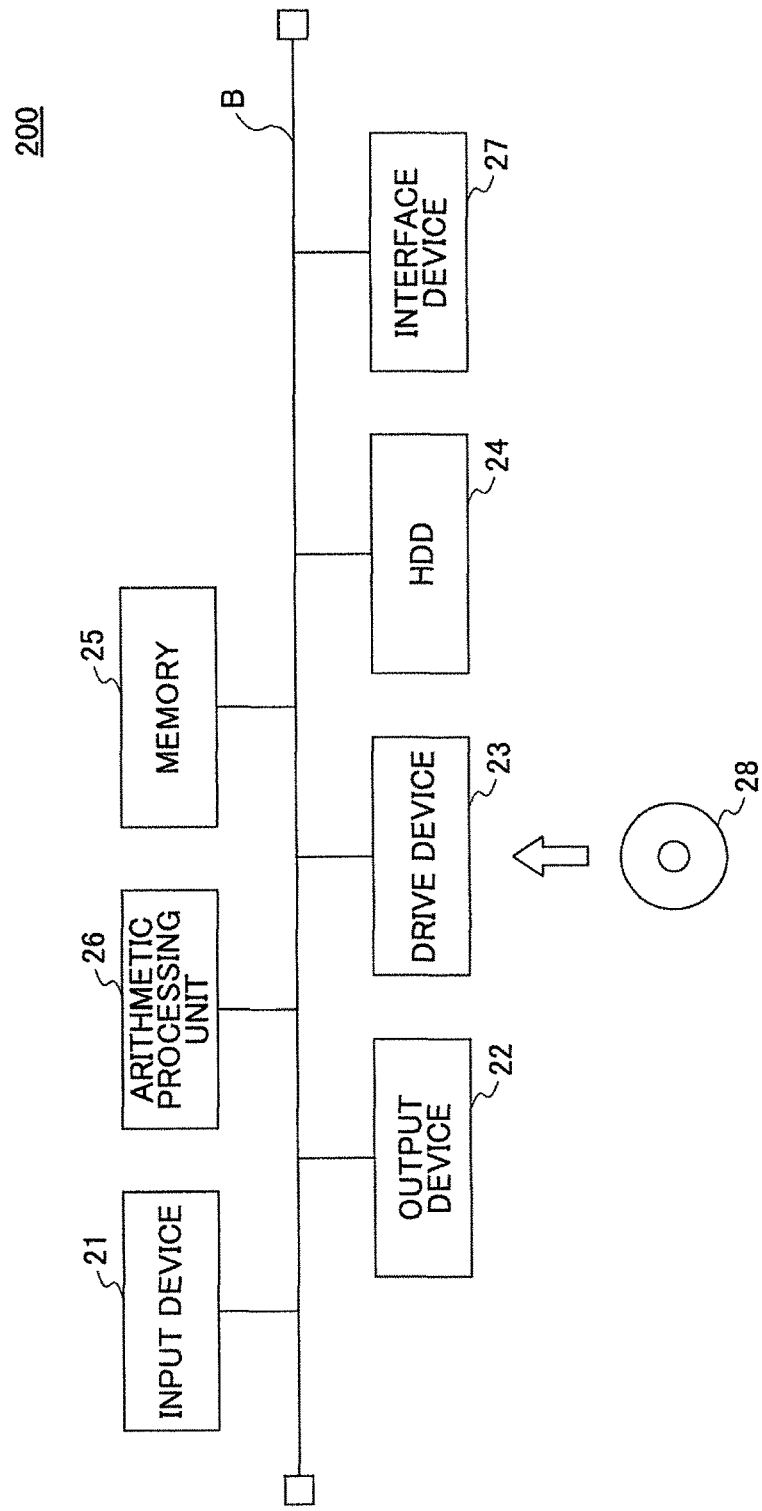
FIG. 4 illustrates an example hardware configuration of the opinion collection server.

In the following, an example hardware configuration of the opinion collection server 200 according to this embodiment is described with reference to FIG. 4. FIG. 4 illustrates the example hardware configuration of the opinion collection server 200.

The opinion collection server 200 in this embodiment includes an input device 21, an output device 22, a drive device 23, an auxiliary storage device 24, a memory 25, an arithmetic processing unit 26, and an interface device 27 which are mutually connected to each other via bus B.

The input device 21 includes, for example, a keyboard and a mouse, and is used to input various signals. The output device 22 includes, for example, a display device, and is used to display various windows, data and the like. The interface device 27 includes, for example, a modem and a LAN card, and is used to connect with a network.

The opinion collection program 250 is at least one of the various programs to control the opinion collection server 200. The opinion collection program 250 may be provided based on, for example, distribution of a recording medium 28 or downloaded from the network.

As the recording medium 28 storing the opinion collection program 250, various types of recording media may be used. For example, a recording medium such as a CD-ROM, a flexible disk, a magnet-optical disk or the like where the data are optically, electronically, magnetically recorded may be used. Further, a recording medium such as a semiconductor memory like a ROM, a flash memory or the like where data are electrically recorded may also be used.

Further, when the recording medium 28 storing the opinion collection program 250 is set in the drive device 23, the opinion collection program 250 is installed from the recording medium 28 to the auxiliary storage device 24 via the drive device 23. The opinion collection program 250 downloaded from the network is installed in the auxiliary storage device 24 via the interface device 27.

The auxiliary storage device 24 stores not only the installed opinion collection program 250 but also necessary files, data and the like. The memory 25 loads and stores the opinion collection program 250 from the auxiliary storage device 24 when the computer is started. Then, the auxiliary storage device 24 realizes the various processes described below based on the opinion collection program 250 stored in the memory 25.

Figure 5:
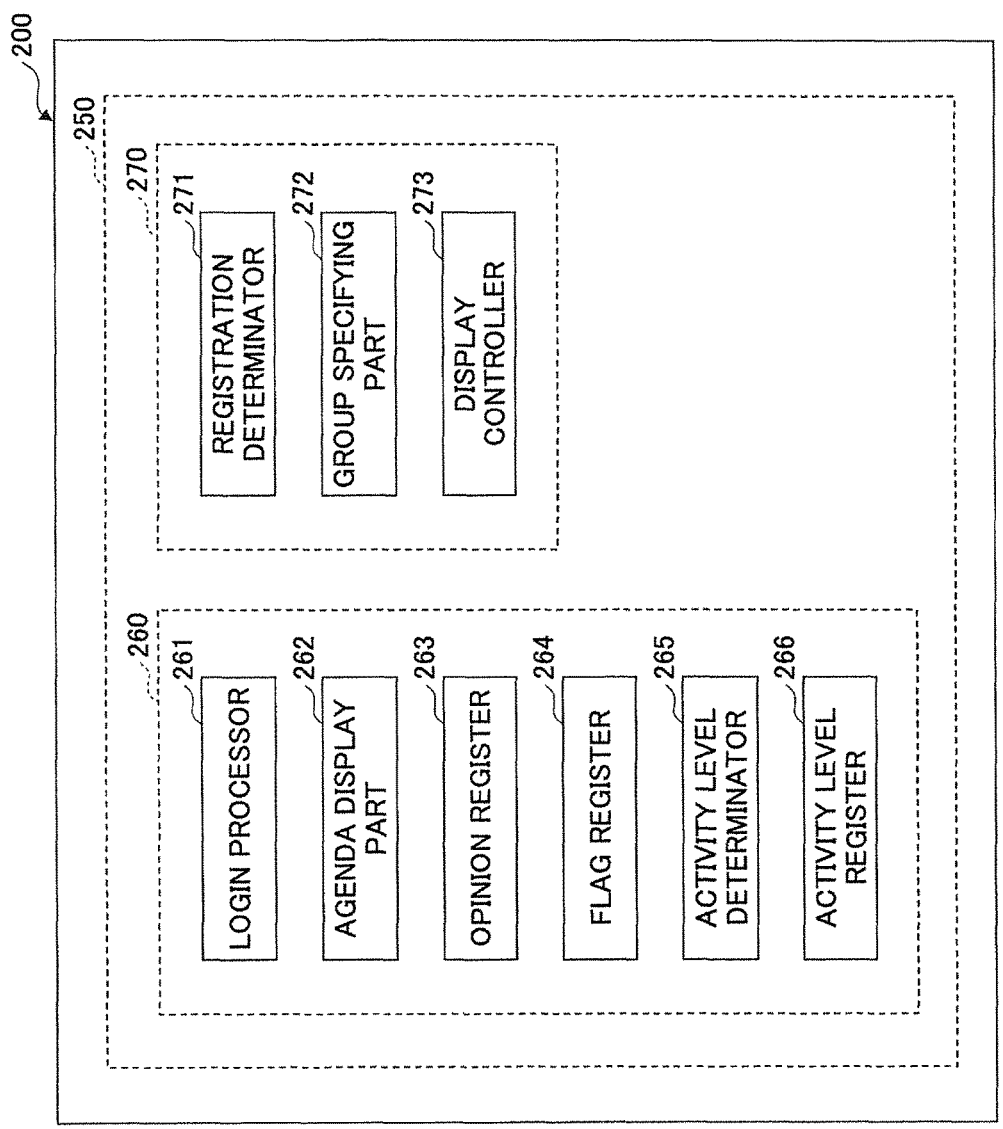
FIG. 5 illustrates an example functional block diagram of the opinion collection server according to the first embodiment.

FIG. 5 illustrates an example functional block diagram of the opinion collection server 200 according to the first embodiment. In this embodiment, the opinion collection program 250 causes the opinion collection server 200 to realize the functions of the following parts.

As illustrated in FIG. 5, the opinion collection server 200 includes a login processor 261, an agenda display part 262, an opinion register 263, a flag register 264, an activity level determinator 265, and an activity level register 266. Those parts are functional parts that the group discussion program 260 causes the opinion collection server 200 to realize.

The login processor 261 refers to the student database 210 and performs a login process so that the students may login the opinion collection system 100. The agenda display part 262 refers to the agenda database 220 and causes the student terminals 110 to display an agenda which becomes a theme of the group discussion. The agenda to be displayed on the student terminals 110 may be set in advance.

The opinion register 263 registers the opinions in the opinion database 230, the opinions having been transmitted from all the student terminals 110 where the login process has been performed. Further, the opinion register 263 registers the representative opinions of the groups in the opinion database 230, the representative opinions having been transmitted from the student terminals 110 of the students who are the leaders of the respective groups.

The flag register 264 turns on a representative flag for the opinion adopted (selected) as the representative opinion. Further, the flag register 264 refers to the activity level determination database 240 and turns on a flag for an opinion opposite to the representative opinion and an opinion related to the representative opinion.

The activity level determinator 265 refers to the activity level determination database 240 and determines the activity levels of the groups. The term activity levels in this embodiment are used to determine whether the arguments are actively conducted in the respective groups. In this embodiment, it may be determined that the argument is actively conducted if, for example, there are opinions opposite to each other or there are opinions similar to each other or opinions related to each other in the group. The activity level register 266 registers a result determined by the activity level determinator 265 in the opinion database 230.

The opinion collection server 200 further includes a registration determinator 271, a group specifying part 272, and a display controller 273. Those parts are functional parts that the group sharing program 270 causes the opinion collection server 200 to realize.

The registration determinator 271 determines whether the representative opinions of all the groups are registered in the opinion database 230. The group specifying part 272 refers to the opinion database 230 and specifies a group having a higher activity level. The display controller 273 controls the display of the representative opinion of the group specified by the group specifying part 272.

Next, the databases included in the opinion collection server 200 according to this embodiment are described with reference to FIGS. 6 through 9.

FIG. 6 illustrates an example student database 210 according to the first embodiment. As illustrated in FIG. 6, the student database 210 stores information items of a student ID identifying the students, a group ID identifying the group to which the students belong, student name, a leader flag, which of the information items are associated with each other. The leader flag is turned on (set) for the opinion of the leader of a group. The leader where the leader flag is turned on may be registered by a teacher or the like in advance, or may be determined by students during the group discussion.

In the example of FIG. 6, the number of students in group A is four, and the student having the student ID "ST001" is the leader. In this embodiment, in the student terminal 110 of the leader, the representative opinion of the group is specified and transmitted to the opinion collection server 200.

The student database 210 in this embodiment is registered in the opinion collection server 200 by a teacher or the like in advance.

FIG. 7 illustrates an example agenda database 220 according to the first embodiment. As illustrated in FIG. 7, the agenda database 220 stores information items of an agenda ID and agenda which are associated with each other. The data of the agenda ID and the agenda are registered by a teacher or the like in advance.

The agenda database 220 further stores an information item of a display category (or "category") including choices indicating the opinion of the student and corresponding to each agenda ID. In the example of FIG. 7, three choices "agree", "disagree", and "permit" are provided in the category as the opinion of the student. The agenda and the category stored in the agenda database 220 may be displayed on the same screen on the student terminals 110.

FIG. 8 illustrates an example opinion database 230 according to the first embodiment. As illustrated in FIG. 8, the opinion database 230 includes the agenda ID and other information items of the group ID, the activity level, an opinion ID, an opinion, the student ID, a representative flag, an opposing opinion flag, and a related opinion flag, which are associated with the agenda ID.

In the opinion database 230, the activity level is registered by the activity level register 266. The opinion ID is identification information to identify the opinion for each student, and corresponds to the student ID. The opinion in FIG. 8 includes information items of the category and contents. The contents are text data input in response to the category selected by the student.

Further, in the opinion database 230, the representative flag is turned on for the opinion having been selected as the representative opinion. Further, the opposing opinion flag is turned on for an opinion opposite to the representative opinion of the group. Further, the related opinion flag is turned on for an opinion related to the representative opinion.

FIG. 9 illustrates an example activity level determination database 240 according to the first embodiment. As illustrated in FIG. 9, the activity level determination database 240 stores information items of the category of the opinion, key words, and a determination condition, which are associated to the agenda ID.

The determination condition is used to determine the activity levels of the groups. The key words stored in the activity level determination database 240 is used when the opposing opinion flag and the related opinion flag are turned on, and are registered in the activity level determination database 240 in advance.

According to the determination condition in this embodiment, the activity level is determined to be high when the keywords corresponding to the categories are present (used) more than or equal to predetermined times in the opinion in the group. Otherwise, the activity level is determined to be low. The number of the key words included in the opinion may be any number.

Figure 10:
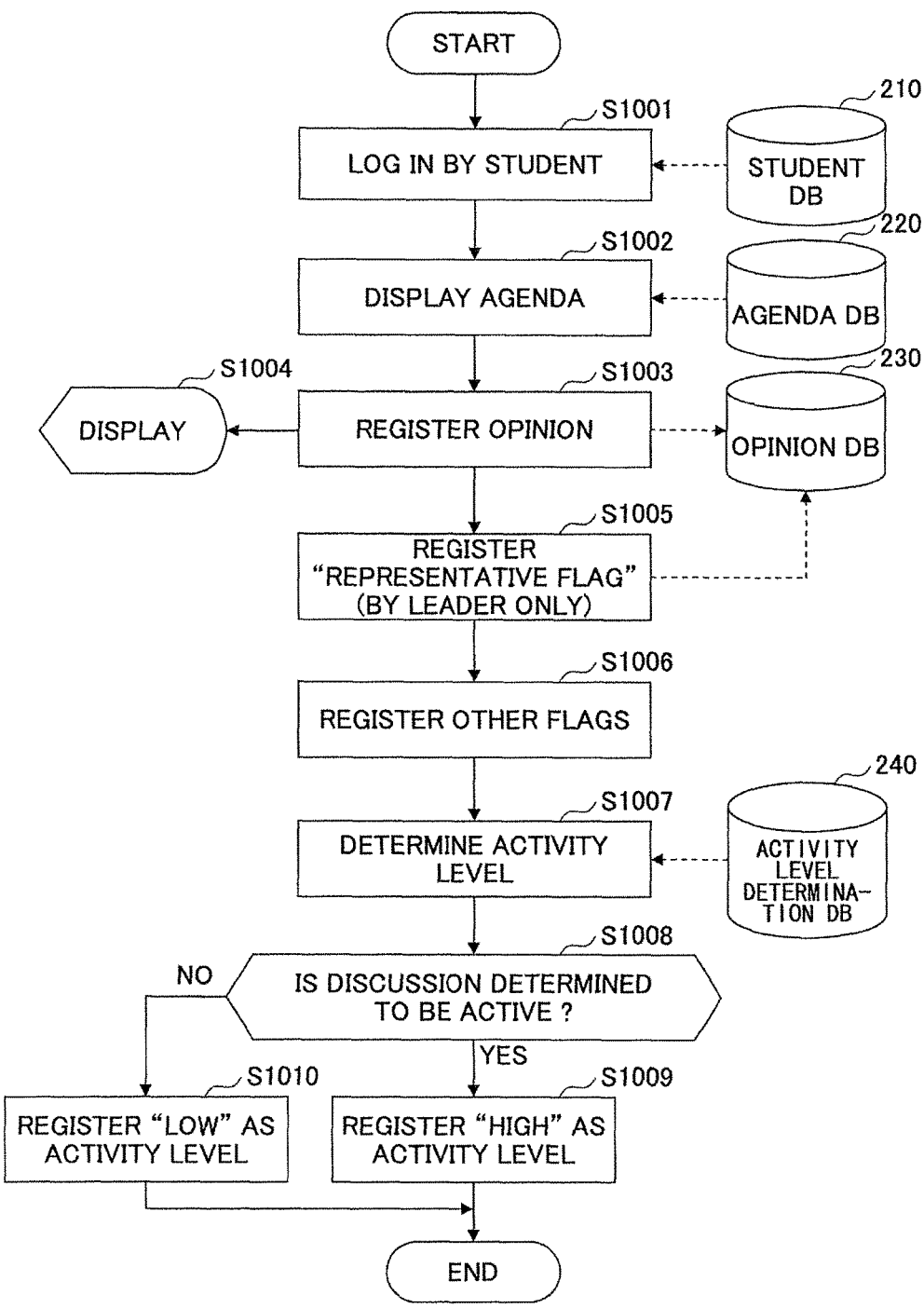
FIG. 10 is an example flowchart of a process executed by the opinion collection server based on a group discussion program according to the first embodiment.

Next, operations of the opinion collection server 200 in this embodiment are described with reference to FIG. 10. FIG. 10 is an example flowchart of a process executed by the opinion collection server based on a group discussion program according to the first embodiment.

As illustrated in FIG. 10, when the student ID and the password are input to the student terminal 110, the login processor 261 of the opinion collection server 200 refers to the student database 210 and performs the login process of the student (step S1001).

Next, the agenda display part 262 of the opinion collection server 200 causes the login student terminals 110 to display the agenda database 220 (step S1002). In this case, the agenda display part 262 may further display the category of the opinion corresponding to the agenda ID in the agenda database 220 along with the agenda at the same time. In this case, it is assumed that the order of displaying the agendas is determined in advance.

FIG. 11 illustrates an example screen 111 displaying agenda on the student terminals 110. As illustrated in FIG. 11, the screen 111 displays (includes) an agenda display section 112, a selection section 113 to select category, an opinion input section 114 to input an opinion, and an opinion registration button 115.

When the category is selected in the selection section 113, an opinion is input in the opinion input section 114, and the opinion registration button 115 is operated in the screen 111 of the student terminal 110, the opinion register 263 of the opinion collection server 200 registers the opinion in the opinion database 230 (step S1003).

The registered opinions of the students are shared among and displayed on the student terminals 110 of the students belonging to the same group, and are used for the discussions in the group.

Figure 12:
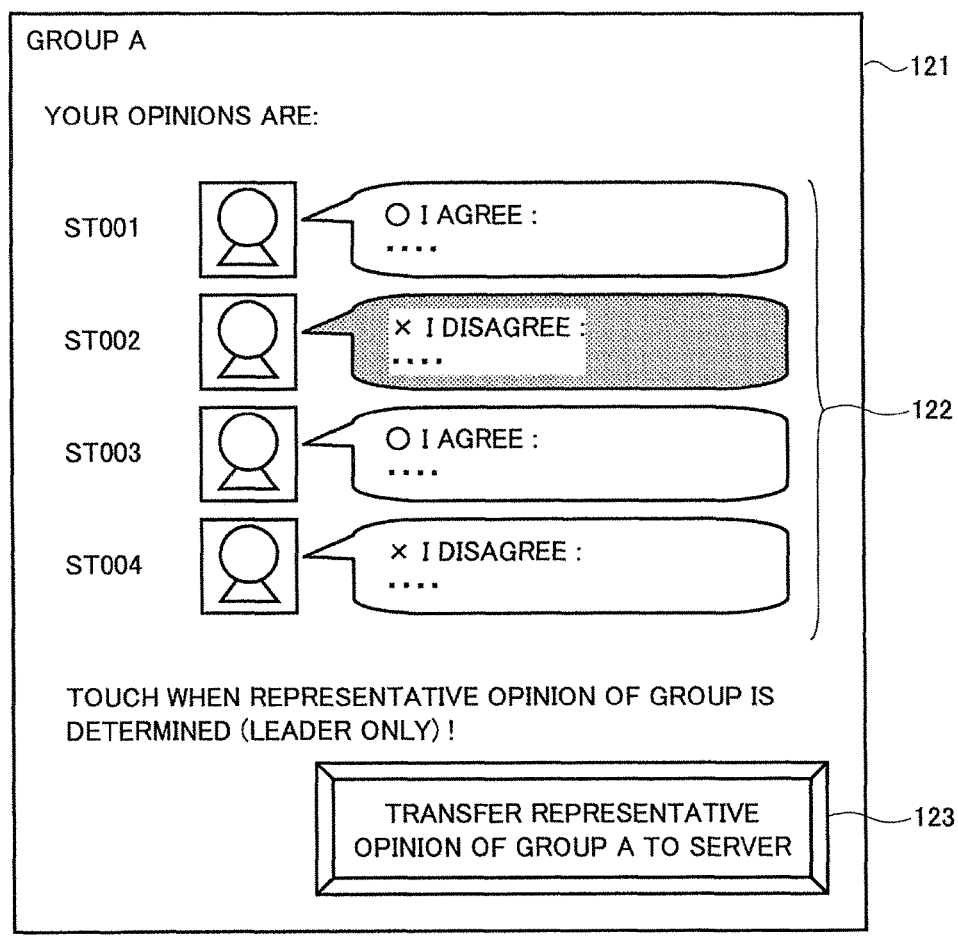
FIG. 12 illustrates an example screen where opinions are collectively displayed on the student terminal.

FIG. 12 illustrates an example screen 121 where opinions are collectively displayed on the student terminal 110. Here, it is assumed that the screen 121 is for the student terminal 110 of the leader in the group. As illustrated in FIG. 12, the screen 121 displays an opinion section 122 to display opinions of the students in the same group and a transmission button 123 to transmit the representative opinion to the opinion collection server 200.

Here, it is assumed that the transmission button 123 is displayed only on the student terminal 110 of the leader in the group. Further, it is assumed that a setting of the student terminal 110 of the leader is made in advance to the student terminal 110 of the leader of the student who has become the leader of the group.

In the opinion section 122 in FIG. 12, the category and the contents of the opinions of four students in group A are displayed.

When the representative opinion of the group is selected as a result of discussion and the representative opinion is transmitted from the student terminal 110 of the leader, the flag register 264 turns on the representative flag for the opinion adopted (selected) as the representative opinion (step S1005).

Next, the flag register 264 of the opinion collection server 200 selects the opinion opposite to the representative opinion and the opinion related to the representative opinion and turns on the respective flags for the opinions (step S1006).

Specifically, the flag register 264 selects, as the opposing opinion, an opinion including the keywords, the number of the keywords being greater than or equal to a predetermined number, that is stored in the activity level determination database 240 from among the opinions in which the category opposite to the category of the representative opinion is selected.

Further, the flag register 264 selects, as the related opinion, an opinion including the keywords, the number of the keywords being greater than or equal to a predetermined number, that is stored in the activity level determination database 240 from among the opinions in which the category following the representative opinion is selected.

Specifically, for example, in this embodiment, if the category of the representative opinion is "agree", the flag register 264 selects (sets), as the opposing opinion, an opinion in which the category is "disagree" and that includes the keywords corresponding to the category "disagree", the number of the keywords being greater than or equal to a predetermined number, the keywords being stored in the activity level determination database 240.

Further, if the category of the representative opinion is "agree", the flag register 264 selects (sets), as the related opinion, an opinion in which the category is "permit" and that includes the keywords corresponding to the category "permit", the number of the keywords being greater than or equal to a predetermined number, the keywords being stored in the activity level determination database 240.

Further, if the category of the representative opinion is "disagree", the flag register 264 selects (sets), as the opposing opinion, an opinion in which the category is "agree" and that includes the keywords corresponding to the category "agree", the number of the keywords being greater than or equal to a predetermined number, the keywords being stored in the activity level determination database 240.

Further, if the category of the representative opinion is "disagree", the flag register 264 also selects (sets), as the opposing opinion, an opinion in which the category is "permit" and that includes the keywords corresponding to the category "permit", the number of the keywords being greater than or equal to a predetermined number, the keywords being stored in the activity level determination database 240.

Next, the activity level determinator 265 of the opinion collection server 200 determines the activity level of the group (steps S1007 and S1008). Specifically, the activity level determinator 265 refers to the activity level determination database 240 and determines whether the number of the stored keywords corresponding to the categories is greater than or equal to a predetermined number in the contents of the opinions of the students in the group.

When determining that the number of the stored keywords is greater than or equal to the predetermined number, the activity level determinator 265 determines that the activity level of the group is high. In this embodiment, the predetermined number is, for example, five.

For example, in this embodiment, in the contents of the opinions corresponding to the opinion IDs "OP001" through "OP0005" (in FIG.8), the number of the keywords stored in the activity level determination database 240 is five or more. Therefore, the activity level of the group A is determined as high.

Next, the activity level register 266 of the opinion collection server 200 registers information indicating that the activity level is high in the column (part) of the activity level into the opinion database 230 with respect to the group whose activity level is determined to be high in step S1008 (step S1009), and terminates the process.

On the other hand, the activity level register 266 registers information indicating that the activity level is low in the column (part) of the activity level into the opinion database 230 with respect to the group whose activity level is determined not to be high in step S1008 (step S1010), and terminates the process.

Figure 13:
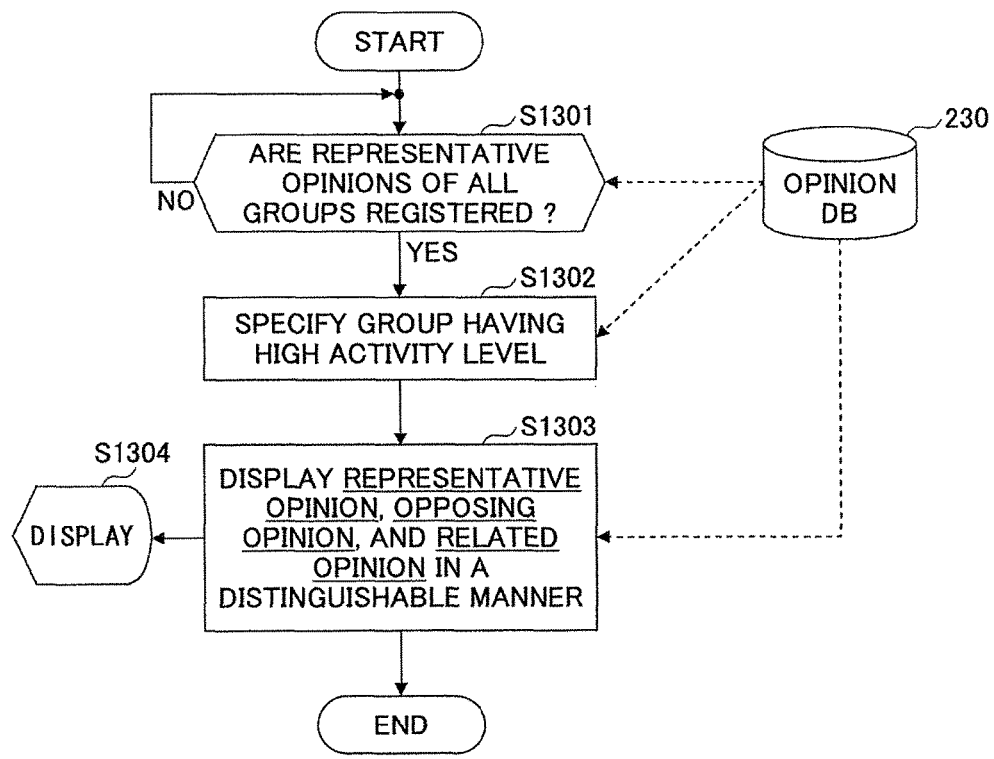
FIG. 13 is an example flowchart of a process executed by the opinion collection server based on a group sharing program according to the first embodiment.

Next, an operation of the opinion collection server 200 is described with reference to FIG. 13. FIG. 13 is an example flowchart of a process executed by the opinion collection server 200 based on a group sharing program according to the first embodiment.

In this embodiment, the registration determinator 271 of the opinion collection server 200 determines whether the representative opinions of all the groups are registered in the opinion database 230 (step S1301).

Specifically, the registration determinator 271 determines whether the representative flag is turned on for all the groups. When determining that the representative opinions of all the groups are registered in the opinion database 230 in step S1301, the group specifying part 272 refers to the opinion database 230 and specifies a group whose activity level is determined to be high (step S1302).

Next, the display controller 273 of the opinion collection server 200 causes the display device 300 to display the representative opinions of the groups (step S1303), and terminates the process. In this case, the display controller 273 causes the display device 300 to display in a manner that the operator (i.e., the student) watching the display device 300 may easily recognize the presence of the opposing opinion and the related opinion as well as the representative opinion for the group specified as the group whose activity level is high by the group specifying part 272. In response to an instruction from the display controller 273, the display device 300 displays the representative opinions of the groups (step S1304).

FIGS. 14A and 14B illustrate examples where representative opinions of groups are displayed on the display device 300 according to the first embodiment. More specifically, FIG. 14A illustrates an example where it is visibly recognizable the presence of the opposing opinion and the related opinion by using the tab display. On the other hand, FIG. 14B illustrates an example where it is visibly recognizable the presence of the opposing opinion and the related opinion by dividing a display area into plural segments.

A screen 141 of FIG. 14A illustrates an example where the activity level of group C is high. In the screen 141, tabs 143 and 144 are formed on the outer periphery of a display area 142 where the representative opinion of the group C is displayed. In FIG. 14A, for example, the tab 143 may be used to display the opposing opinion of the representative opinion, and the tab 144 may be used to display the related opinion of the representative opinion. For example, when the tab 143 is selected by a pointing device or that like, the display controller 273 may cause the display device 300 to display the opposing opinion in the display area 142.

In this embodiment, by displaying the tabs formed on the outer periphery of the display area 142 displaying the representative opinion, it becomes possible to recognize the presence of opposing opinion and the related opinion of the representative opinion in the display area. Further, FIG. 14A illustrates a case where two tabs are displayed. However, for example, if there is the related opinion only and there is no opposing opinion, only one tab may be displayed. Further, if there are three or more opinions of the opposing opinions or the related opinions, three or more tabs may be displayed.

In a screen 145 of FIG. 14B, there is a display area 146 for displaying the representative opinions of the groups and a display area 147 for displaying the opposing opinions and the related opinions. In the screen 145, the groups A and C are determined, by the group specifying part 272, as the groups whose activity level is high.

As illustrated in FIG. 14B, in the group A, the related opinion of the representative opinion is displayed in the display area 147. In the group C, the opposing opinion and the related opinion of the representative opinion are displayed in the display area 147.

As described above, according to this embodiment, by providing the display area 147 for displaying the opposing opinions and the related opinions in addition to the display area 146 for displaying the representative opinions, it becomes possible to visibly recognize the existence of the opposing opinion or the related opinion.

FIG. 15 illustrates an example where representative opinions of the groups are displayed. A screen 151 of FIG. 15 displays the representative opinions only. Therefore, it is not clear whether there is any opinion other than the representative opinion in a process of determining the representative opinion. Also, if there is such an opinion other than the representative opinion, it is not possible to know what is the opinion based on the screen 151 of FIG. 15.

However, in this embodiment, if there are opinions presented in the process of determining the representative opinion of the group as a result of group discussion, it becomes possible to visibly recognize the existence of the opinions.

Further, in this embodiment, the opposing opinions and the related opinions of the respective representative opinions may be displayed on the display device. Therefore, according to this embodiment, it becomes possible to recognize the existence of the opinions that have not been adopted as the representative opinions and have not been displayed.

Further, in this embodiment, it may become possible to visualize the density of the group discussion in the process of determining the representative opinion. Namely, in this embodiment, it may become possible to specify the group where the opposing opinions and the related opinions exist and determine that active group discussion was conducted in the group. Therefore, according to this embodiment, it may become possible to know the density of the argument in the group discussion and the activity level on an individual basis as well.

Further, in this embodiment, it becomes possible to extract the opposing opinions and the related opinions of the representative opinions. Therefore, it may become possible to share various opinions among the groups, and therefore, the class may be effectively managed more than before.

Second Embodiment

In the following, a second embodiment is described with reference to the drawings. In the second embodiment, a method of determining the activity level is different from that in the first embodiment. Therefore, in the description of the second embodiment, the same reference numerals are used for the parts (elements) having the same functions and configurations as those in the first embodiment.

In this embodiment, as the discussion in step S1005 of FIG. 10 is conducted by chat (exchanging opinions on a typed conversation basis) among the student terminals 110 via an opinion collection server 200A.

Figure 16:
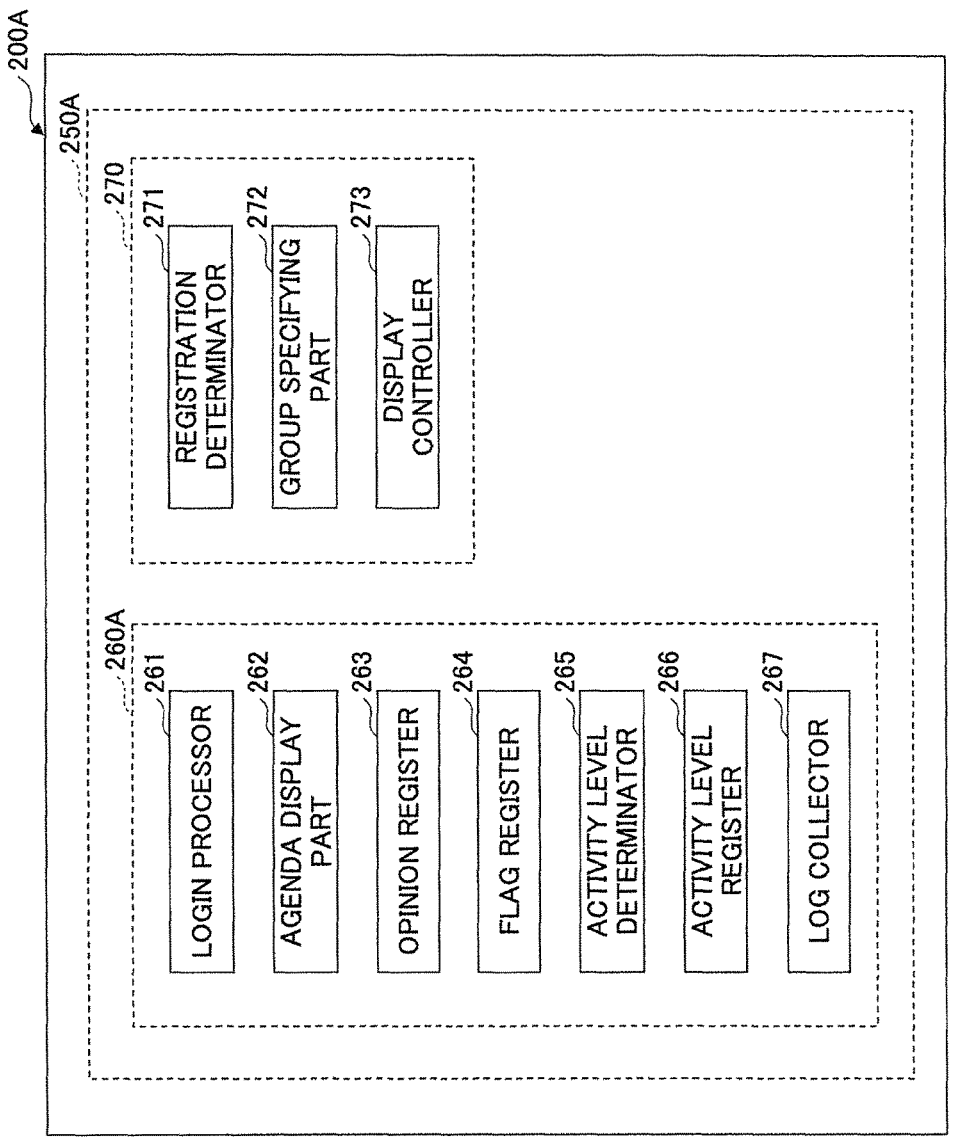
FIG. 16 illustrates an example functional block diagram of the opinion collection server according to a second embodiment.

FIG. 16 illustrates an example functional block diagram of the opinion collection server 200A according to the second embodiment. Further, an opinion collection program 250A is installed in the opinion collection server 200A of this embodiment. A group discussion program 260A in this embodiment realizes the function of a log collector 267 in the opinion collection server 200A. The log collector 267 is described below.

The log collector 267 collects chat logs among student terminals 110 in the groups and stores the collected chat logs in a log database 231. Specifically, the log collector 267 acquires text data input to the student terminals 110 in chat as logs. The log database 231 may be included in the opinion collection server 200A.

FIG. 17 illustrates an example activity level determination database 240A according to the second embodiment. As illustrated in FIG. 17, the activity level determination database 240A includes the agenda ID and other information items corresponding to the agenda IDs. The information items include the category, the keywords, and a determination condition to determine the activity level.

The determination condition in the embodiment is the number of letters in the text data acquired as the log. The activity level determinator 265 determines that the activity level is high when the number of letters in the text data acquired as the log is greater than or equal to a predetermined number for the agenda IDs.

Figure 18:
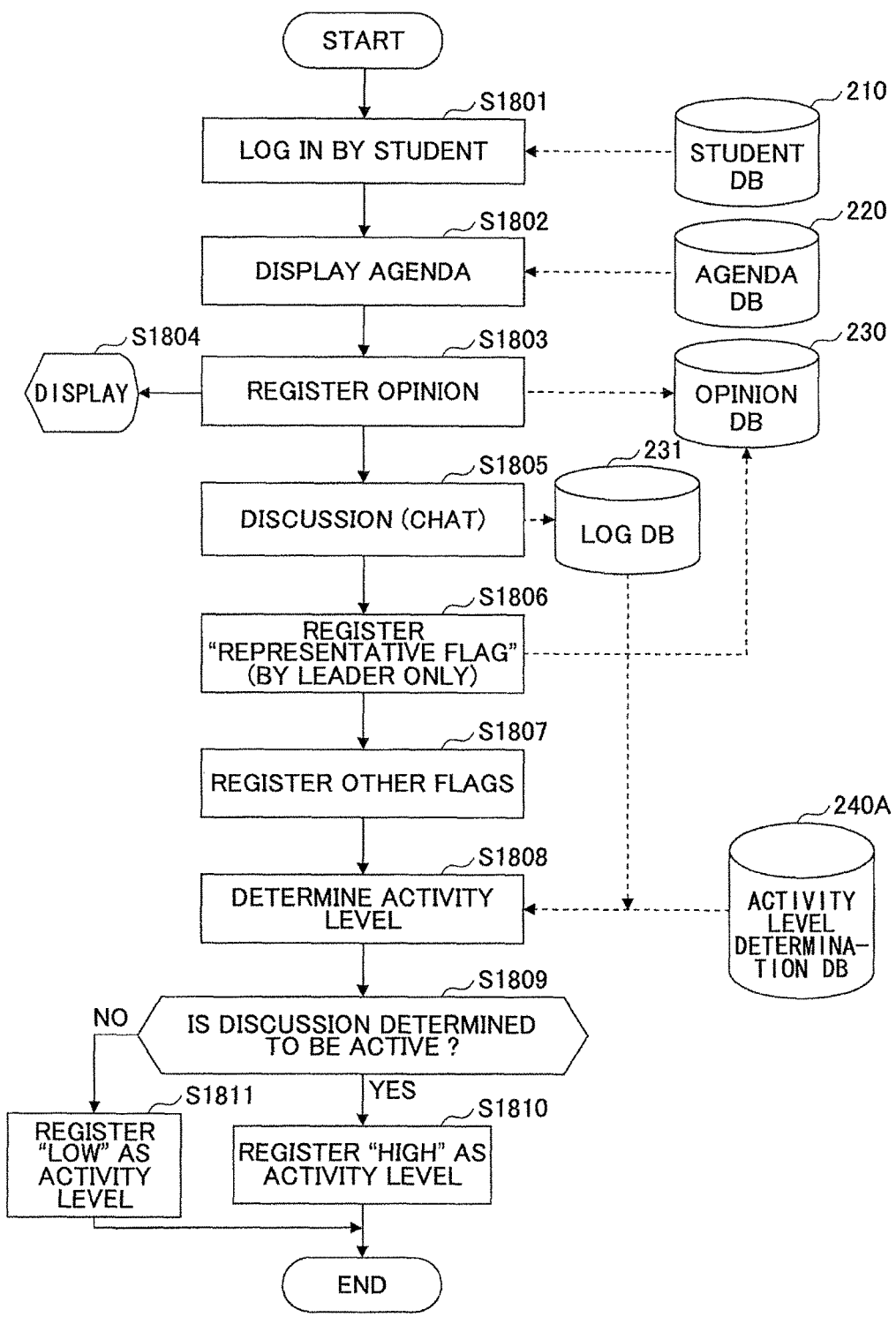
FIG. 18 is an example flowchart of a process executed by the opinion collection server based on the group discussion program according to the second embodiment.

FIG. 18 is an example flowchart of a process executed by the opinion collection server 200A based on the group discussion program 260 according to the second embodiment. The processes in steps S1801 through S1804 are the same as those in steps S1001 through S1004 in FIG. 10. Therefore, the repeated descriptions may be omitted.

Next, the log collector 267 of the opinion collection server 200A acquires the logs of text data input as the discussion conducted via the student terminals 110, and stores the acquired logs in the log database 231 (step S1805).

The processes in steps S1806 and S1807 are the same as those in steps S1005 and S1006 in FIG. 10. Therefore, the repeated description may be omitted.

Next, the activity level determinator 265 of the opinion collection server 200A refers to the log database 231 and the activity level determination database 240A, and determines the activity levels of the groups (step S1808).

The processes in steps S1809 through S1811 are the same as those in steps S1008 through S1010 in FIG. 10. Therefore, the repeated description may be omitted.

Third embodiment

In the following, a third embodiment is described with reference to the drawings. In the third embodiment, an opinion of a student, the number of times when the opinions of the student are adopted (selected) as the representative opinions being infrequent, is focused on. In the descriptions of the third embodiment, the same reference numerals are used to describe the same parts (elements) having the same functions in the descriptions of the first embodiment, and the repeated descriptions thereof may be omitted.

Figure 19:
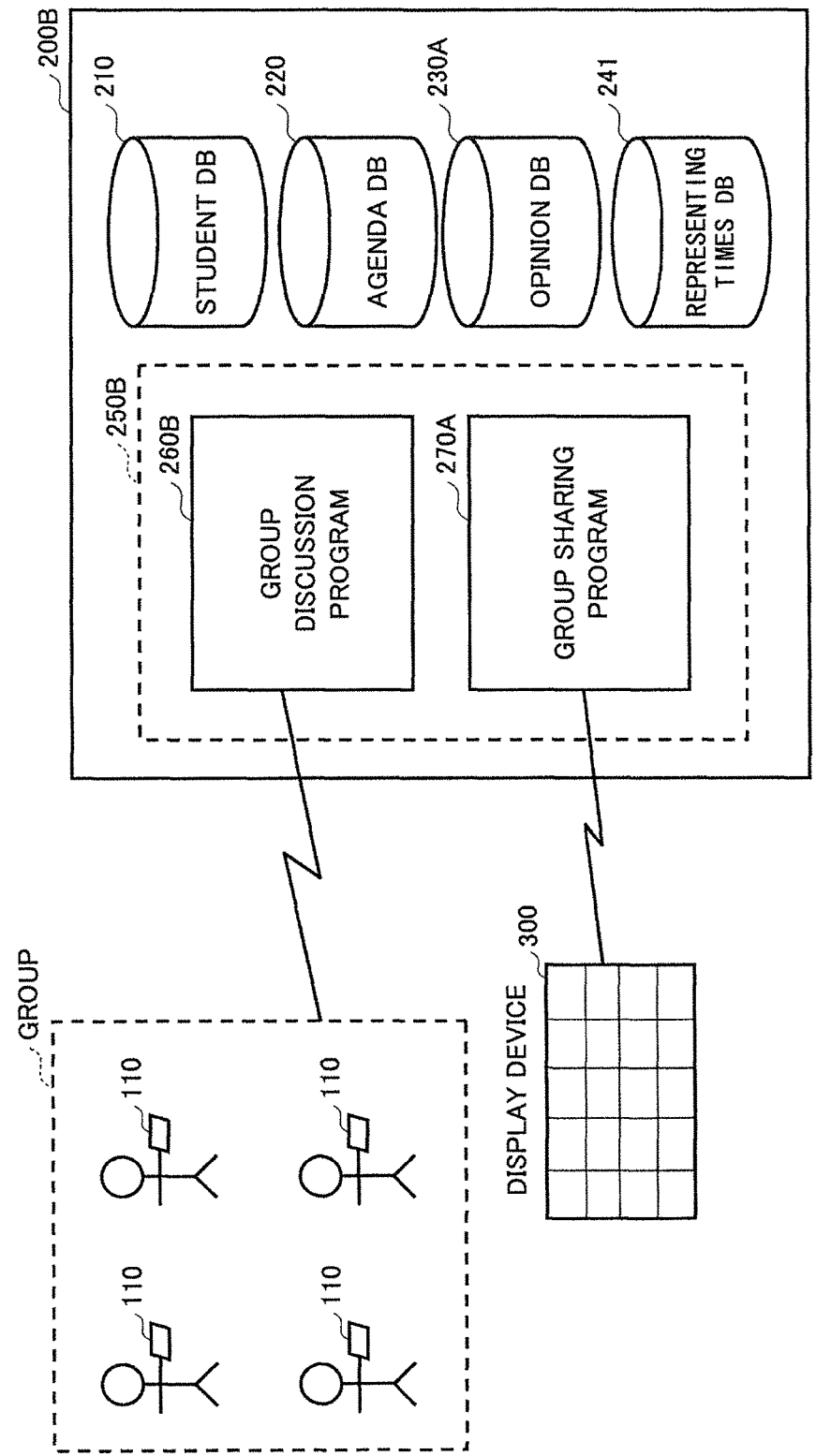
FIG. 19 illustrates an example configuration of the opinion collection system according to a third embodiment.

FIG. 19 illustrates an example configuration of an opinion collection system 100A according to the third embodiment.

As illustrated in FIG. 19, an opinion collection server 200B of the opinion collection system 100A includes the student database 210, the agenda database 220, an opinion database 230A, and a representing times database 241. Further, an opinion collection program 250B is installed in the opinion collection server 200B of this embodiment. The opinion collection program 250B includes a group discussion program 260B and a group sharing program 270A.

Figure 20:
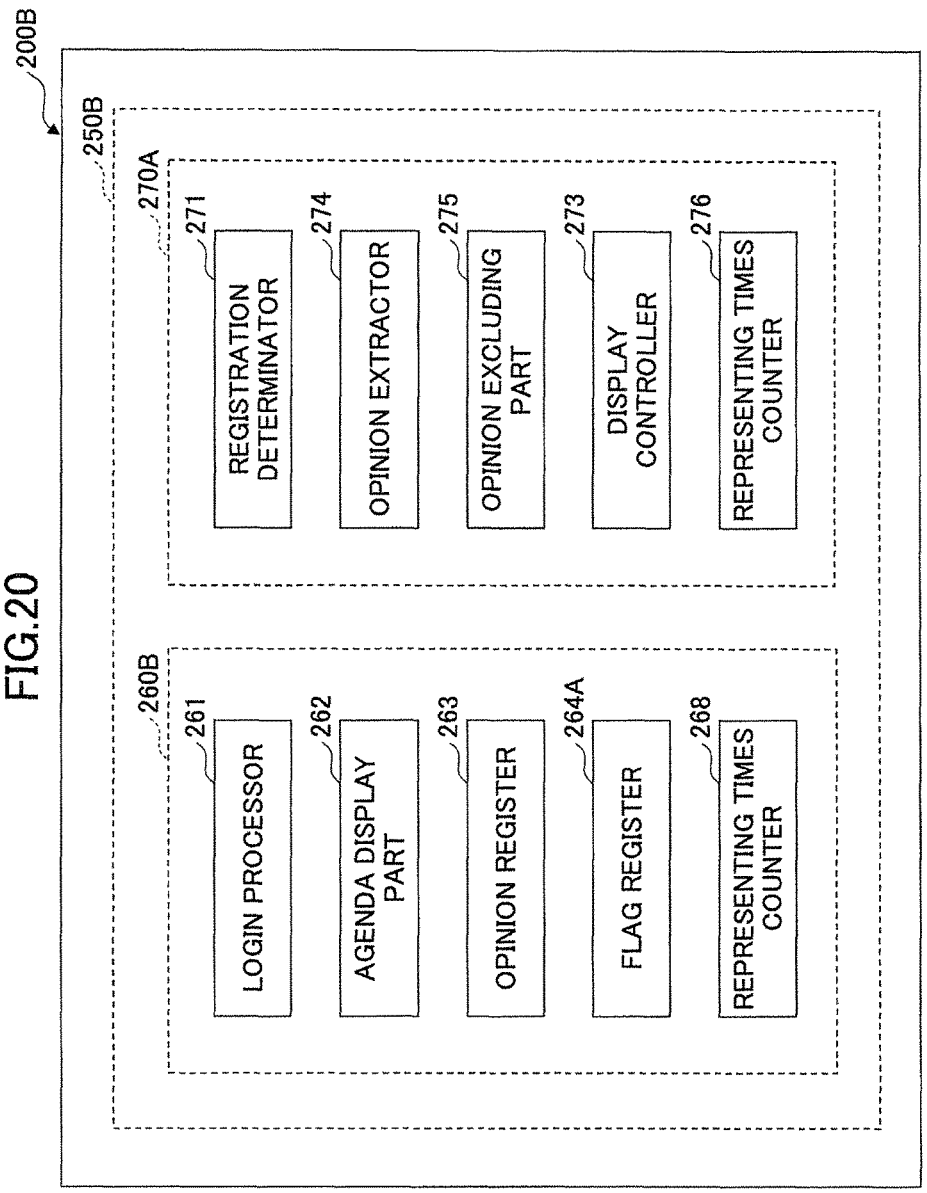
FIG. 20 illustrates an example functional block diagram of the opinion collection server according to the third embodiment.

FIG. 20 illustrates an example functional block diagram of the opinion collection server 200B according to the third embodiment. In this embodiment, the opinion collection program 250B causes the opinion collection server 200B to realize the functions of the parts described below.

As illustrated in FIG. 20, the opinion collection server 200B includes the login processor 261, the agenda display part 262, the opinion register 263, a flag register 264A, and a representing times counter 268. Those parts are the functional parts that a group discussion program 260B causes the opinion collection server 200B to realize.

The representing times counter 268 counts the number of times that the opinion is adopted (selected) as the representative opinion on a student basis (hereinafter "representing times"), and then stores the representing numbers in the representing times database 241.

The flag register 264A in the embodiment turns on the representative flag for the opinion adopted as the representative opinion in the opinion database 230A. Further, the flag register 264A in the embodiment turns on an infrequent representing times flag for a student having infrequent representing times in the opinion database 230A.

Further, the opinion collection server 200B in this embodiment includes the registration determinator 271, the display controller 273, an opinion extractor 274, an opinion excluding part 275, and a representing times counter 276. Those parts are the functional parts that the group sharing program 270A causes the opinion collection server 200B to realize.

The opinion extractor 274 in this embodiment extracts an opinion of the student whose representing times is infrequent in the opinion database 230A. The opinion excluding part 275 in this embodiment excludes the representative opinion if the representative opinion is included in the opinions extracted by the opinion extractor 274. In the display of the display device 300 described below, when an opinion other than the representative opinions is selected, the representing times counter 276 counts up the corresponding representing times in the representing times database 241.

FIG. 21 illustrates an example opinion database 230A according to the third embodiment. As illustrated in FIG. 21, the opinion database 230A includes the agenda ID and other information items corresponding to the agenda IDs. The information items include the opinion ID, opinion, the student ID, the representative flag, and the infrequent representing times flag.

FIG. 22 illustrates an example representing times database 241 according to the third embodiment. As illustrated in FIG. 22, the representing times database 241 includes information items of the student ID, the representing times, and an extracting condition which are associated with each other. The extracting condition is used to extract an opinion of the student whose representing times that the number of times when the opinions of the student are adopted as the representing times is infrequent. In this embodiment, for example when the representing times of the student is in the bottom 10% in the class, it is determined that the representing times is infrequent.

Figure 23:
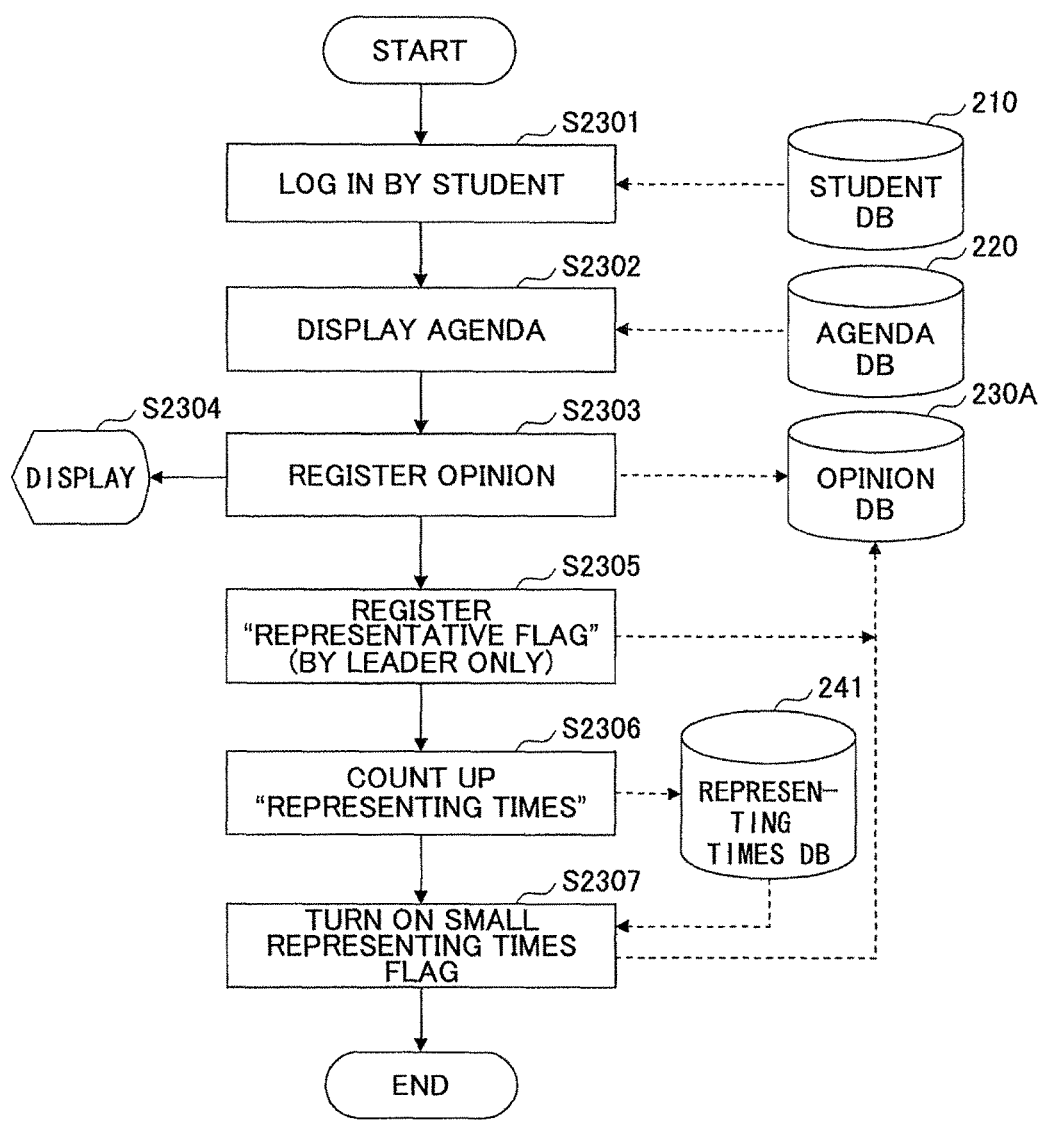
FIG. 23 is an example flowchart of a process executed by the opinion collection server based on the group discussion program according to the third embodiment.

FIG. 23 is an example flowchart of a process executed by the opinion collection server 200B based on the group discussion program 260B according to the third embodiment.

The processes in steps S2301 through S2305 in FIG. 23 are the same as those in steps S1001 through S1005 in FIG. 10. Therefore, the repeated descriptions may be omitted.

The representing times counter 268 of the opinion collection server 200B counts up the representing times corresponding to the student ID of the student whose representative flag is turned on in the representing times database 241 (step S2306).

The opinion collection server 200B acquires the student ID of the student whose representing times is in the bottom 10% of the class in the representing times database 241. Then, the flag register 264A turns on the infrequent representing times flag for the student corresponding to the student ID acquired by the opinion collection server 200B in the opinion database 230A (step S2307). The process is terminated.

Figure 24:
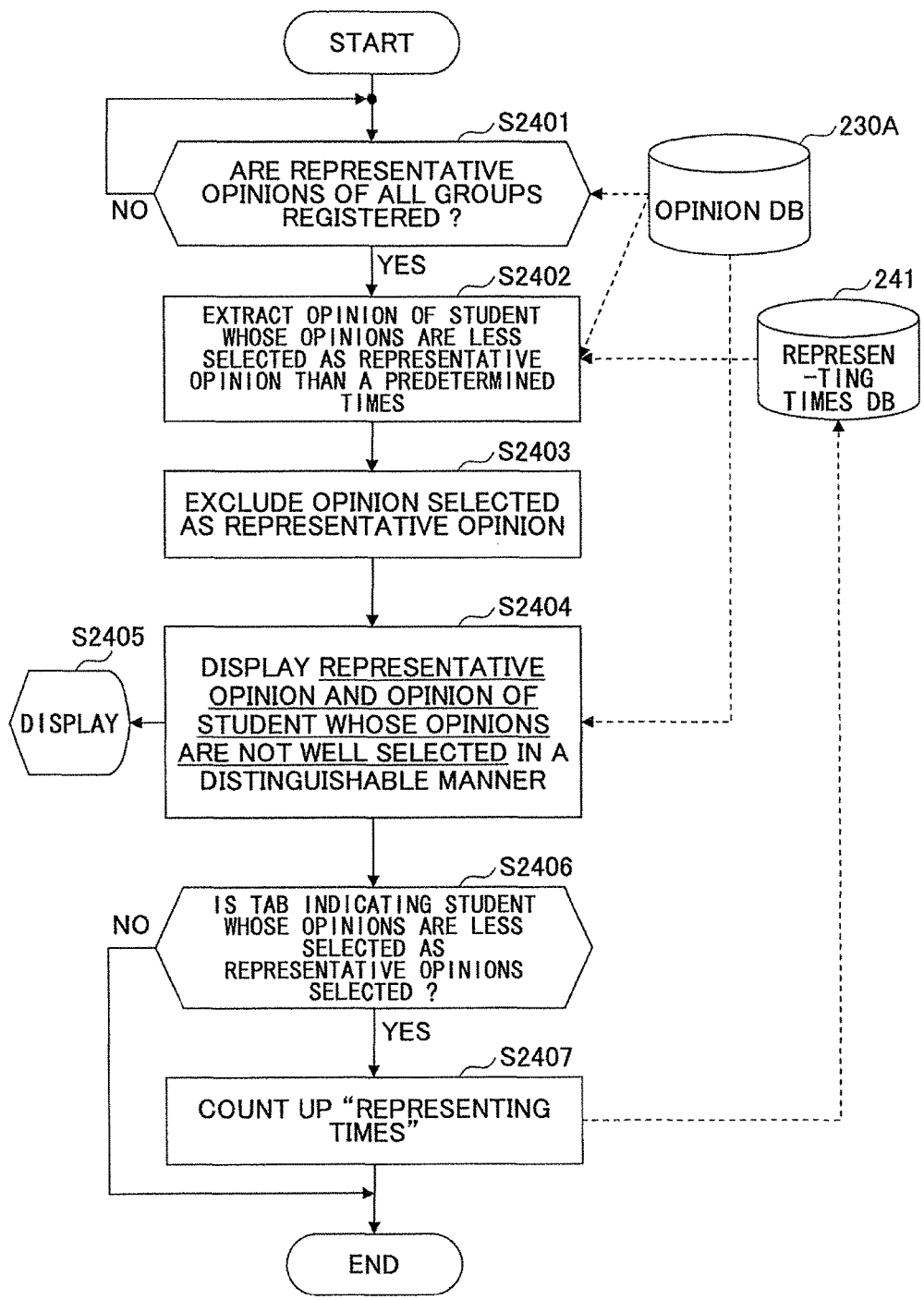
FIG. 24 is an example flowchart of a process executed by the opinion collection server based on the group sharing program according to the third embodiment.

FIG. 24 is an example flowchart of a process executed by the opinion collection server 200B based on the group sharing program 270A according to the third embodiment.

The registration determinator 271 of the opinion collection server 200B determines whether the representative flag is turned on for all the groups (step S2401). When the representative flag is turned on for all the groups the opinion extractor 274 extracts the opinion ID where the infrequent representing times flag is turned on in the opinion database 230A (step S2402).

Next, the opinion excluding part 275 of the opinion collection server 200B excludes the opinion ID where the representative flag is turned on in the opinions corresponding to the extracted opinion IDs (step S2403).

Next, the display controller 273 of the opinion collection server 200B causes the display device 300 to display the representative opinions of the groups. Further, the display controller 273 causes the display device 300 to display in a manner that it is possible to recognize the opinion of the students whose representing times is infrequent in the respective groups (step S2404). Here, the opinion of the students whose representing times is infrequent refers to an opinion after the opinions are excluded, the opinions being selected as the representative opinions in step S2403 from among the opinions extracted in step S2402.

The display device 300 receives instructions from the display controller 273, and displays the representative opinions of the groups (step S2405). Next, the opinion collection server 200B determines whether the opinion of the student whose representing number is infrequent is selected by the teacher or the like (step S2406). When determining that the opinion of the student whose representing number is infrequent is selected in step S2406, the representing times counter 276 counts up the representing times corresponding to the student ID in the representing times database 241 (step S2407). Then, the process is terminated.

FIGS. 25A and 25B illustrate examples where representative opinions of the groups are displayed on the display device 300 according to the third embodiment. More specifically, FIG. 25A illustrates an example where it is visibly recognizable the presence of the opinion of the student whose representing number is infrequent by using a tab. On the other hand, FIG. 25B illustrates an example where it is visibly recognizable the presence of the opinion of the student whose representing number is infrequent by dividing the display area into plural areas.

A screen 251 of FIG. 25A illustrates an example where there are two opinions of the student whose representing number is infrequent. On the screen 251, tabs 252 and 253 are formed on the outer periphery of a display area 252 where the representative opinion of the group C is displayed. In FIG. 25A, for example, the tab 253 may be used to display the opinion of a student whose representing number is infrequent. Also, the tab 253 may be used to display another opinion of a student whose representing number is infrequent.

For example, on the display device 300, when the tab 253 is selected by a pointing device or that like, the display controller 273 may cause the display device 300 to display the opinion of the student whose representing number is infrequent, the opinion corresponding to the display area 252 and the tab 253. When the opinion corresponding to the tab 253 is displayed in the display area 252, the representing number of the student ID corresponding to the opinion ID of the opinion displayed based on the tab 253 is counted up.

In this embodiment, by displaying the tabs formed on the outer periphery of the display area 252 displaying the representative opinion, it becomes possible to recognize that there is an opinion different from the representative opinion in the display area 252. Further, FIG. 25A illustrates a case where the number of tabs is two. However, the number of the tabs is not limited to two.

In a screen 255 of FIG. 25B, there are a display area 256 for displaying the representative opinions of the groups and a display area 257 for displaying opinions of the students whose representing number is infrequent. In the screen 255, there is an opinion of a student whose representing number is infrequent in the group A, and there is no such an opinion in the groups B and C.

Further, in the group A, the student ID of the student whose representing number is infrequent may also be displayed in the display area 257. Further, the opinion corresponding to the student ID may also be displayed.

As described above, according to this embodiment, for example, even when there is such a student who may not positively express his/her opinion in discussion and the like, and accordingly his/her opinion is unlikely to be adopted as the representative opinion, the existence of the opinion of the student may be shared with other students. Therefore, in this embodiment, the existence of the opinion that has been neither adopted as the representative opinion nor presented may be recognized among students.

Further, in this embodiment, it is more likely to extract an opinion that has not been adopted as the representative opinion. Therefore, various opinions may be shared among the groups, and a class may be managed more effectively than earlier.

Fourth Embodiment

In the following, a fourth embodiment is described with reference to the drawings. In the fourth embodiment, an opinion to which teacher's comments are to be added may be focused on. In the descriptions of the fourth embodiment, the same reference numerals are used to describe the parts (elements) same as those in the first embodiment, and the repeated descriptions thereof may be omitted.

FIG. 26 illustrates an example configuration of an opinion collection system 100B according to the fourth embodiment.

As illustrated in FIG. 26, an opinion collection server 200C of the opinion collection system 100B includes the student database 210, the agenda database 220, an opinion database 230B, and a comment added opinion database 242. Further, an opinion collection program 250C is installed in the opinion collection server 200C in this embodiment. The opinion collection program 250C includes a group discussion program 260C and a group sharing program 270B.

Figure 27:
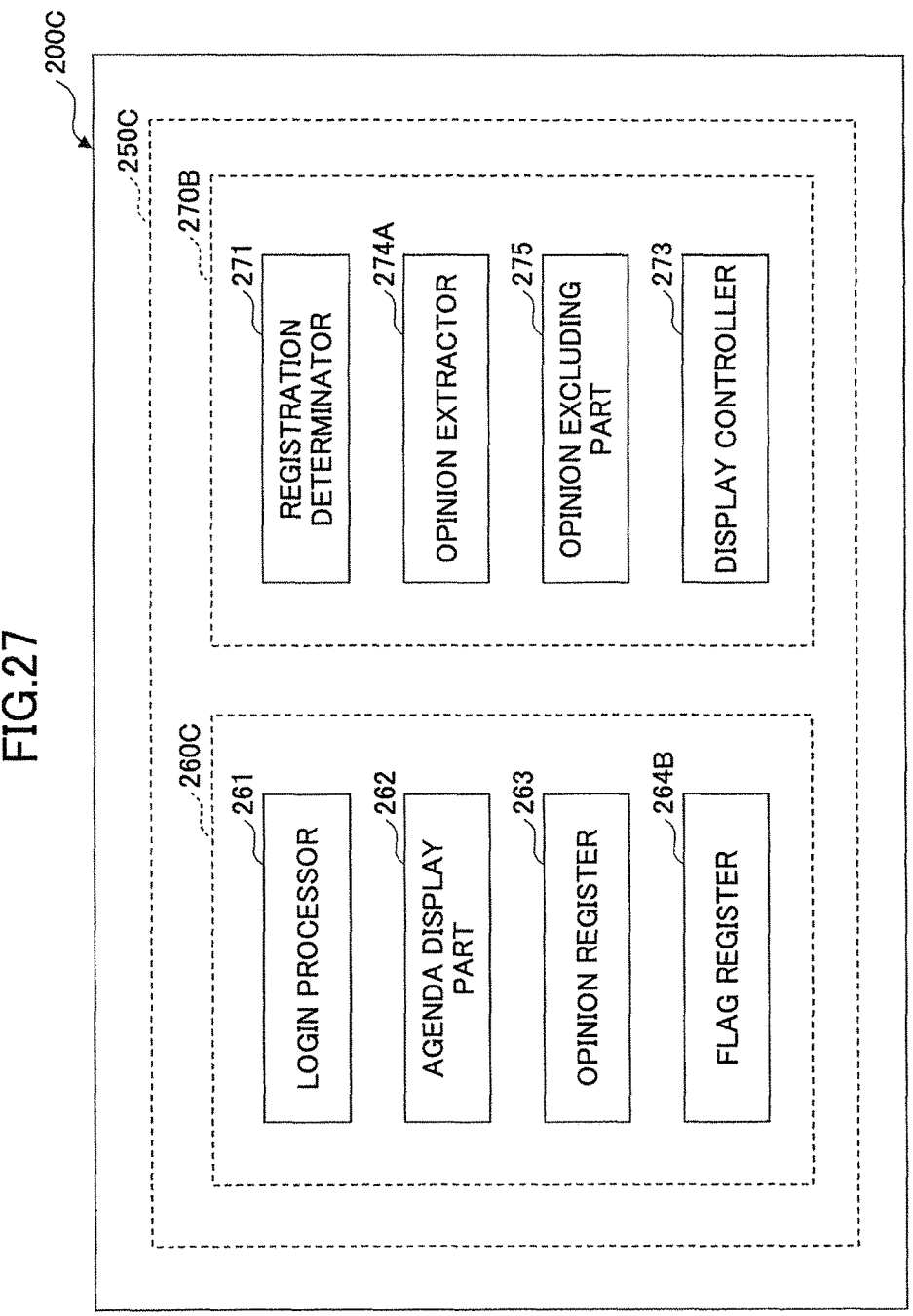
FIG. 27 illustrates an example functional block diagram of the opinion collection server according to the fourth embodiment.

FIG. 27 illustrates an example functional block diagram of the opinion collection server 200C according to the fourth embodiment. In this embodiment, the opinion collection program 250C causes the opinion collection server 200C to realize the functions of the parts described below.

As illustrated in FIG. 27, the opinion collection server 200C includes the login processor 261, the agenda display part 262, the opinion register 263, and a flag register 264B. Those parts are realized by the opinion collection server 200C based on the group discussion program 260C. Namely, the group discussion program 260C causes the opinion collection server 200C to realize those parts.

The flag register 264B in this embodiment turns on the representative flag for the opinion having been adopted as the representative opinion in the opinion collection server 200C. Further, the flag register 264B in this embodiment refers to the comment added opinion database 242, and turns on a comment added opinion flag for an opinion including keywords stored in advance.

The opinion collection server 200C in this embodiment further includes the registration determinator 271, the display controller 273, an opinion extractor 274A, and the opinion excluding part 275. Those parts (elements) are realized by the opinion collection server 200C based on the group sharing program 270B. Namely, the group sharing program 270B causes the opinion collection server 200C to realize those parts.

The opinion extractor 274A extracts an opinion including keywords stored in the comment added opinion database 242 in advance in the opinion database 230B. The comment added opinion database 242 is described below. Namely, the opinion extractor 274A extracts an opinion corresponding to the opinion ID where the comment added opinion flag is turned on by the flag register 264B. Further, if there is a representative opinion included in the opinions extracted by the opinion extractor 274A, the opinion excluding part 275 excludes the representative opinion.

FIG. 28 illustrates an example opinion database 230B according to the fourth embodiment. As illustrated in FIG. 28, the opinion database 230B includes the agenda ID and other information items corresponding to the agenda ID. The information items includes the opinion ID, the opinion, the student ID, the representative flag, the comment added opinion flag, and a comment ID. The comment ID is acquired from the comment added opinion database 242 described below.

FIG. 29 illustrates an example comment added opinion database 242 according to the fourth embodiment. As illustrated in FIG. 29, the comment added opinion database 242 includes the agenda ID and other information items corresponding to the agenda ID. The information items include the comment ID, keywords, and contents of comments. The keywords and the contents of comments in the comment added opinion database 242 according to this embodiment are registered in advance by a teacher or the like.

In this embodiment, for example, in a case where an opinion corresponding to the agenda of the agenda ID "Q001" is input via the student terminal 110 and the opinion includes a keyword corresponding to the comment ID "CM001", the comment ID "CM001" and the corresponding comments are added to the opinion.

Figure 30:
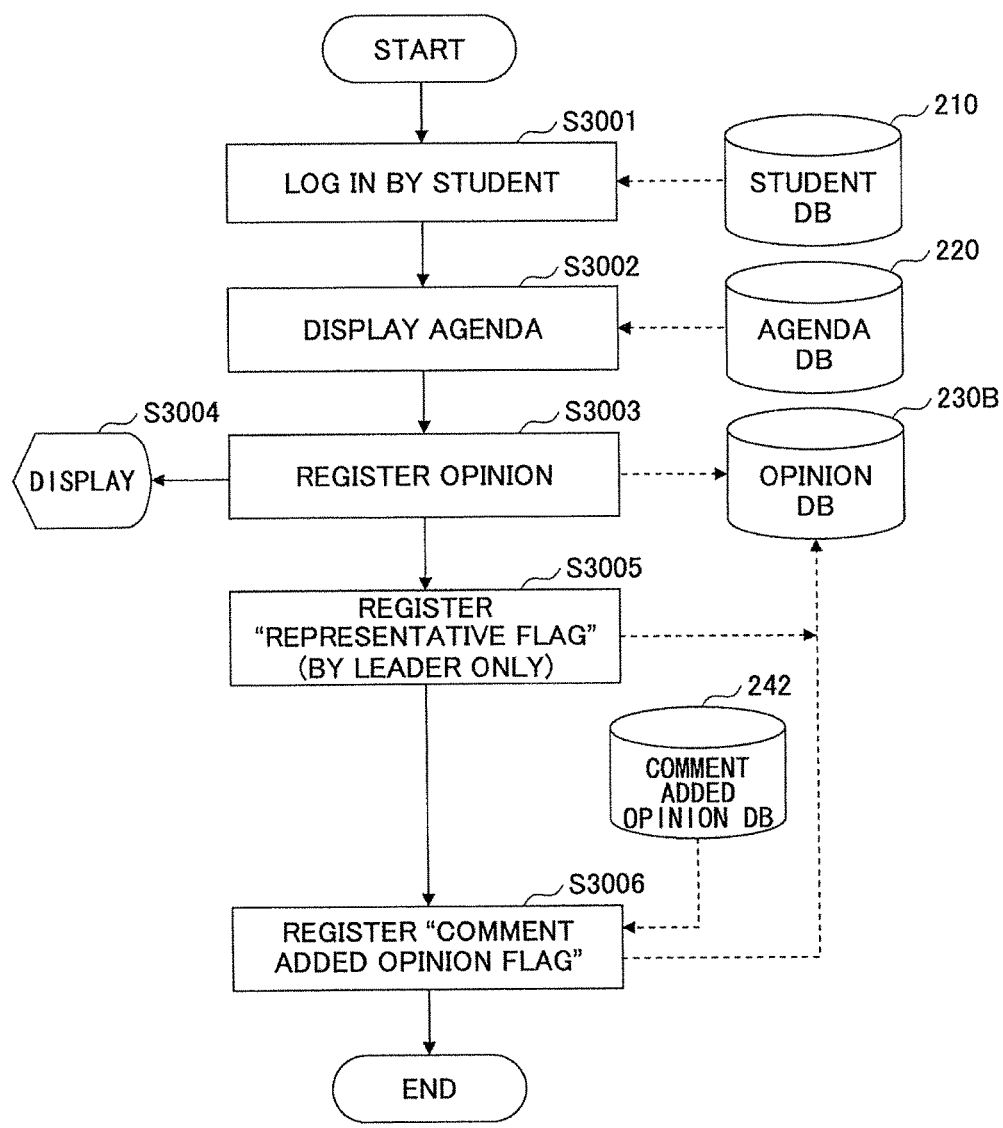
FIG. 30 is an example flowchart of a process executed by the opinion collection server based on the group discussion program according to the fourth embodiment.

FIG. 30 is an example flowchart of a process executed by the opinion collection server 200C based on the group discussion program 260C according to the fourth embodiment.

The processes in steps S3001 through S3005 in FIG. 30 are the same as those in steps S1001 through S1005 in FIG. 10. Therefore, the repeated descriptions may be omitted.

When, there is a comment including the keyword stored (registered) in the comment added opinion database 242 among the opinions in the opinion database 230B, the flag register 264B turns on the comment added opinion flag for the comment (step S3006). Then, the process is terminated.

In the following, a process of the flag register 264B is specifically described.

For example, a case of the opinion ID "OP001" corresponding to the agenda ID "Q001" in the opinion database 230B is described. In this case, the flag register 264B determines whether the contents of the opinion ID "OP001" includes a keyword corresponding to the agenda ID "Q001" in the comment added opinion database 242.

In the example of FIG. 28, the contents of the opinion ID "OP001" includes the keyword corresponding to the comment ID "CM001". Therefore, the flag register 264B turns on the comment added opinion flag. Further, the flag register 264B associates and stores the comment ID "CM001" with the opinion ID "OP001" in the opinion database 230B.

Figure 31:
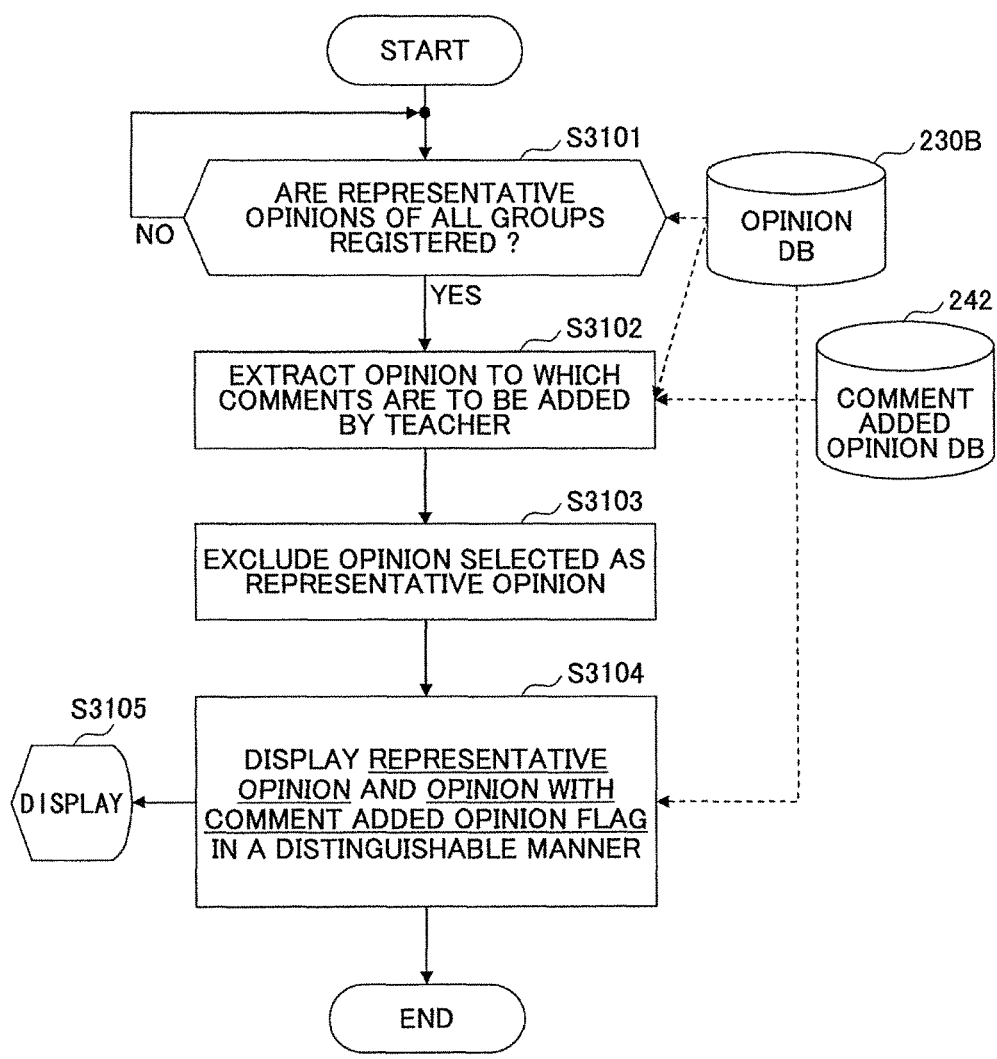
FIG. 31 is an example flowchart of a process executed by the opinion collection server based on the group sharing program according to the fourth embodiment.

FIG. 31 is an example flowchart of a process executed by the opinion collection server 200C based on the group sharing program 270B according to the fourth embodiment.

The opinion collection server 200C in this embodiment refers to the opinion database 230B, and the registration determinator 271 determines whether the representative flag is turned on for all the groups (step S3101).

When the representative flag is turned on for all the groups in step S3101, the opinion extractor 274A extracts an opinion to which a comment from a teacher is to be added (step S3102). Specifically, the opinion extractor 274A extracts an opinion for which the comment added opinion flag is turned on in the opinion database 230B.

Next, the opinion excluding part 275 excludes the opinion for which the representative flag is turned on from among the opinions extracted in step S3102 (step S3103). Next, the display controller 273 of the opinion collection server 200C causes the display device 300 to display the representative opinions. The display controller 273 causes the display device 300 to recognizably display an opinion to which a comment is to be added for the groups (step S3104).

The opinion to which a comment is to be added refers to an opinion that is extracted in step S3102 and that is not excluded in step S3103 because the opinion is not the opinion selected as the representative opinion. The display device 300 receives instructions from the display controller 273 and displays the representative opinions of the groups (step S3105).

Figure 32A:
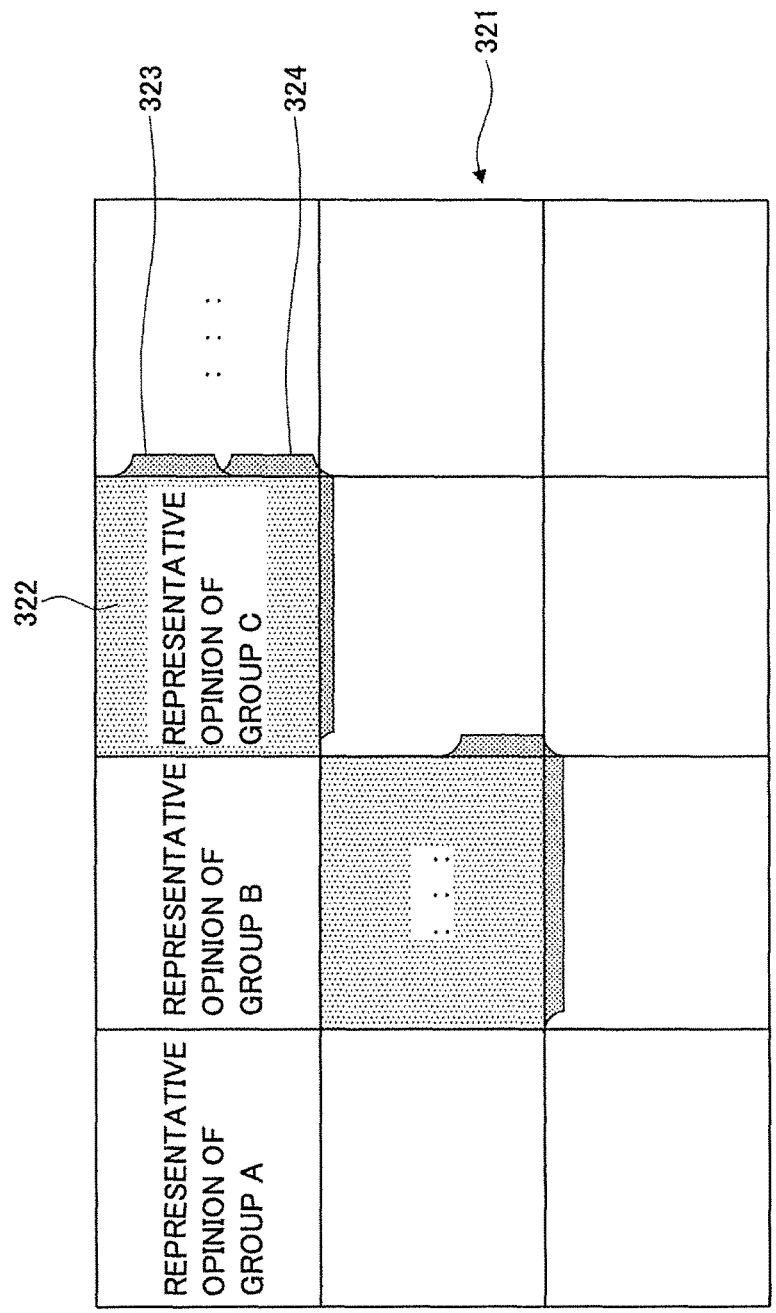

FIGS. 32A and 32B illustrate examples where representative opinions of the groups are displayed on the display device 300 according to the fourth embodiment. More specifically, FIG. 32A illustrates an example where it is visibly recognizable that there is an opinion to which a comment is to be added by using a tab. On the other hand, FIG. 32B illustrates an example where it is visibly recognizable that there is an opinion to which a comment is to be added by dividing the display area into plural areas.

A screen 321 of FIG. 32A illustrates an example where there are two opinions to which comments are to be added. In the screen 321, tabs 323 and 324 are formed on the outer periphery of a display area 322 where the representative opinion of the group C is displayed. In FIG. 32A, for example, the keywords included the opinions may be displayed on the respective tabs 323 and 324.

In this embodiment, for example, on the display device 300, when the tab 323 is selected by a pointing device or that like, the display controller 273 may cause the display device 300 to display the opinion corresponding to the tab 323. In the opinion collection server 200C, when the tab 323 is selected, a comment corresponding to the comment ID related to opinion ID corresponding to the tab 323 is displayed on the output device 22 of the opinion collection server 200C or the like.

In this embodiment, by displaying the tabs 323 and 324 formed on the outer periphery of a display area 322 where the representative opinion is displayed, it becomes possible to visibly recognize the presence of opinions different from the representative opinion in the display area. In the example of FIG. 32A, the number of tabs is two. However, the number of the tabs is not limited to two.

In a screen 325 of FIG. 32B, there are a display area 326 for displaying the representative opinions of the groups and a display area 327 for displaying opinions to which comments are to be added in the groups. The screen 325 illustrates that there is a student who stated an opinion to which a comment is to be added.

The opinion collection server 200C in this embodiment may be a teacher terminal to be used by a teacher or the like. Therefore, the teacher may watch the display of the opinion collection server 200C and make a comment on the opinions of the students.

Further, in this embodiment, opinions corresponding to the comments provided by a teacher in advance may be extracted. Therefore, a teacher may use the comments in the class without wasting the teacher's preparations for the class in advance.

Namely, in this embodiment, an opinion that has not been selected as the representative opinion and that has not been shared may be extracted. Therefore, it may become possible to share various opinions among groups and manage the class more effectively than before.

According to an embodiment, a method of supporting a group work includes collecting input contents, which are input by participants via terminals, from the terminals; arranging the collected input contents into input content groups based on groups to which the participants belong; setting a representative flag on each of representative input contents selected from the respective input content groups; extracting the representative input contents and matching input contents, which match a predetermined extracting condition and are different from the representative input contents, from the collected input contents; and displaying a list of the representative input contents and the matching input contents on a display device that all the participants are able to view at a same time.

According to an embodiment, the method may further include referring to a determination database storing categories of the input contents and keywords corresponding to the categories; and identifying one or more of the groups whose input contents include a predetermined number or more of the keywords stored in the determination database.

According to an embodiment, in the identifying of the method, one or more of the groups whose input contents include the predetermined number of the keywords that corresponds to the categories other than the categories corresponding to the representative input contents may be identified.

According to an embodiment, the method may further include acquiring a log of communications between the terminals for each of the groups; storing the log in a log database; and identifying one or more of the groups whose log includes a number of characters that it greater than or equal to a predetermined value.

According to an embodiment, the method may further include displaying opposing input contents, which are input contents that include the keywords corresponding to a category that is opposite to the category of the representative input contents, on the display device; and displaying related input contents, which are input contents that includes the keywords corresponding to a category that is related to the category of the representative input contents, on the display device.

According to an embodiment, the input contents of the participants belonging to one of the groups may be displayed next to each other on the terminals of the participants.

According to an embodiment, on the display device, the representative input contents or the opposing or related input contents may be displayed on the same display area by selecting one of tabs corresponding to the representative input contents and the opposing or related input contents.

According to an embodiment, on the display device, the representative input contents and the opposing or related input contents may be displayed in different display areas.

According to an embodiment, a method of supporting a group work includes collecting input contents, which are input by participants via terminals, from the terminals; arranging the collected input contents into input content groups based on groups to which the participants belong; setting a representative flag on each of representative input contents selected from the respective input content groups; extracting the representative input contents and the input contents of a participant whose representing number, which indicates a number of times that the representative flag is set, is less than or equal to a predetermined value; and displaying a list of the representative input contents and the input contents on a display device that all the participants are able to view at a same time.

According to an embodiment, when the input contents of the participant are displayed on the display device, the representing number of the participant may be increased in a representing number database.

According to an embodiment, a method of supporting a group work includes collecting input contents, which are input by participants via terminals, from the terminals; arranging the collected input contents into input content groups based on groups to which the participants belong; setting a representative flag on each of representative input contents selected from the respective input content groups; extracting the representative input contents and matching input contents, which include a predetermined keyword previously registered for comments in a comment added opinion database and are different from the representative input contents, from the collected input contents; and displaying a list of the representative input contents and the matching input contents on a display device that all the participants are able to view at a same time.

According to an embodiment, a computer-readable recording medium storing a program that causes a computer to execute a method of supporting a group work, the method including collecting input contents, which are input by participants via terminals, from the terminals; arranging the collected input contents into input content groups based on groups to which the participants belong; setting a representative flag on each of representative input contents selected from the respective input content groups; extracting the representative input contents and matching input contents, which match a predetermined extracting condition and are different from the representative input contents, from the collected input contents; and displaying a list of the representative input contents and the matching input contents on a display device that all the participants are able to view at a same time.

According to an embodiment, a server for supporting a group work includes a collector collecting input contents, which are input by participants via terminals, from the terminals; a flag register arranging the collected input contents into input content groups based on groups to which the participants belong and setting a representative flag on each of representative input contents selected from the respective input content groups; and a display controller extracting the representative input contents and matching input contents, which match a predetermined extracting condition and are different from the representative input contents, from the collected input contents and displaying a list of the representative input contents and the matching input contents on a display device that all the participants are able to view at a same time.

According to an embodiment, a system for supporting a group work includes a server for supporting the group work, the server including a collector collecting input contents, which are input by participants via terminals, from the terminals; a flag register arranging the collected input contents into input content groups based on groups to which the participants belong and setting a representative flag on each of representative input contents selected from the respective input content groups; and a display controller extracting the representative input contents and matching input contents, which match a predetermined extracting condition and are different from the representative input contents, from the collected input contents and displaying a list of the representative input contents and the matching input contents on a display device that all the participants are able to view at a same time.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the sprit and scope of the invention.

What is claimed is:

1. A non-transitory computer-readable recording medium that causes a computer to execute a process comprising:
   displaying an agenda at multiple terminals;
   collecting input contents being input by participants with respect to the agenda displayed at the multiple terminals, through the terminals;
   displaying, at the multiple terminals, a screen including the input contents being collected for each of groups to which the participants belong, the screen allowing sending a representative input content with respect to a leader terminal used by a leader among terminals of each group;
   specifying representative input contents, which are selected from the input contents being displayed for the groups, respectively, upon receiving the representative input contents from leader terminals respective to the groups;
   displaying a list, in which the representative input contents are listed for the groups;
   determining, for each of the groups based on predetermined keywords corresponding to categories and a determination condition for determining an activity level, that the activity level is high, in response to a number of input keywords that satisfies the determination condition, the input keywords being included in the predetermined keywords and contained in the input contents being collected;
   specifying one or more groups each in which the activity level is high, based on the determined activity level; and
   displaying, on a display device, existence of one or more other input contents included in the input contents by one or more first areas outside a second area of each of the specified one or more groups among the representative input contents corresponding to the groups in the list, each of the one or more first areas being smaller than the second area displaying the representative input content for each of the specified one or more groups.

2. The non-transitory computer-readable recording medium according to claim 1,
   wherein the process further includes:
   referring to a determination database storing the categories of the input contents and the predetermined keywords corresponding to the categories; and
   identifying one or more of the groups whose input contents include a predetermined number or more of the predetermined keywords stored in the determination database.

3. The non-transitory computer-readable recording medium according to claim 2,
   wherein in the identifying, one or more of the groups whose input contents include the predetermined number of the predetermined keywords that correspond to the categories other than the categories corresponding to the representative input contents are identified.

4. The non-transitory computer-readable recording medium according to claim 1, wherein the process further includes:
acquiring a log of communications between the terminals for each of the groups;
storing the log in a log database; and
identifying one or more of the groups whose log includes a number of characters that is greater than or equal to a predetermined value.

5. The non-transitory computer-readable recording medium according to claim 2,
wherein the process further includes:
displaying opposing input contents, which are input contents that include the predetermined keywords corresponding to a category that is opposite to the category of the representative input contents, on the display device; and
displaying related input contents, which are input contents that include the predetermined keywords corresponding to a category that is related to the category of the representative input contents, on the display device.

6. The non-transitory computer-readable recording medium according to claim 2,
wherein the input contents of the participants belonging to one of the groups are displayed next to each other on the terminals of the participants.

7. The non-transitory computer-readable recording medium according to claim 5,
wherein on the display device, the representative input contents or the opposing or related input contents are displayed on a same display area by selecting one of tabs corresponding to the representative input contents and the opposing or related input contents.

8. The non-transitory computer-readable recording medium according to claim 5,
wherein on the display device, the representative input contents and the opposing or related input contents are displayed in different display areas.

9. The non-transitory computer-readable recording medium according to claim 1,
wherein the process further includes:
extracting the input contents of a participant whose representing number, which indicates a number of times that a representative flag is set, is less than or equal to a predetermined value; and
displaying, on the display device, the extracted input contents by associating with the representative input contents in the list of the representative input contents.

10. The non-transitory computer-readable recording medium according to claim 9,
wherein, when the input contents of the participant are displayed as the one or more other input contents on the display device, the representing number of the participant is increased in a representing number database.

11. A group supporting apparatus comprising:
a processor that executes a process including
displaying an agenda at multiple terminals;
collecting input contents being input by participants with respect to the agenda displayed at the multiple terminals, through the terminals;
displaying, at the multiple terminals, a screen including the input contents being collected for each of groups to which the participants belong, the screen allowing sending a representative input content with respect to a leader terminal used by a leader among terminals of each group;
specifying representative input contents, which are selected from the input contents being displayed for the groups, respectively, upon receiving the representative input contents from leader terminals respective to the groups;
displaying a list, in which the representative input contents are listed for the groups;
determining, for each of the groups based on predetermined keywords corresponding to categories and a determination condition for determining an activity level, that the activity level is high, in response to a number of input keywords that satisfies the determination condition, the input keywords being included in the predetermined keywords and contained in the input contents being collected;
specifying one or more groups each in which the activity level is high, based on the determined activity level; and
displaying, on a display device, existence of one or more other input contents included in the input contents by one or more first areas outside a second area of each of the specified one or more groups among the representative input contents corresponding to the groups in the list, each of the one or more first areas being smaller than the second area displaying the representative input content for each of the specified one or more groups.

12. The group supporting apparatus according to claim 11,
wherein the process further includes:
referring to a determination database storing the categories of the input contents and the predetermined keywords corresponding to the categories; and
identifying one or more of the groups whose input contents include a predetermined number or more of the predetermined keywords stored in the determination database.

13. The group supporting apparatus according to claim 12, wherein in the identifying, one or more of the groups whose input contents include the predetermined number of the predetermined keywords that correspond to the categories other than the categories corresponding to the representative input contents are identified.

14. The group supporting apparatus according to claim 11,
wherein the process further includes:
acquiring a log of communications between the terminals for each of the groups;
storing the log in a log database; and
identifying one or more of the groups whose log includes a number of characters that is greater than or equal to a predetermined value.

15. The group supporting apparatus according to claim 12, wherein the process further includes:
displaying opposing input contents, which are input contents that include the predetermined keywords corresponding to a category that is opposite to the category of the representative input contents, on the display device; and
displaying related input contents, which are input contents that include the predetermined keywords corresponding to a category that is related to the category of the representative input contents, on the display device.

16. The group supporting apparatus according to claim 12,
wherein the input contents of the participants belonging to one of the groups are displayed next to each other on the terminals of the participants.

17. The group supporting apparatus according to claim 15,
wherein on the display device, the representative input contents or the opposing or related input contents are displayed on a same display area by selecting one of tabs corresponding to the representative input contents and the opposing or related input contents.

18. The group supporting apparatus according to claim 15,
wherein on the display device, the representative input contents and the opposing or related input contents are displayed in different display areas.

19. The group supporting apparatus according to claim 11, wherein the process further includes:
extracting the input contents of a participant whose representing number, which indicates a number of times that a representative flag is set, is less than or equal to a predetermined value; and
displaying, on the display device, the extracted input contents by associating with the representative input contents in the list of the representative input contents.

20. The group supporting apparatus according to claim 19,
wherein, when the input contents of the participant are displayed as the one or more other input contents on the display device, the representing number of the participant is increased in a representing number database.

21. The non-transitory computer-readable recording medium according to claim 1, wherein the representative input contents are listed in a matrix format and are displayed on the display device.

* * * * *